(12) United States Patent
Rekstad

(10) Patent No.: US 11,727,932 B2
(45) Date of Patent: *Aug. 15, 2023

(54) METHODS AND SYSTEMS FOR USING VOICE TO CONTROL MULTIPLE DEVICES

(71) Applicant: Comcast Cable Communications, LLC, Philadelphia, PA (US)

(72) Inventor: Michael Rekstad, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/704,641

(22) Filed: Mar. 25, 2022

(65) Prior Publication Data
US 2022/0284897 A1 Sep. 8, 2022

Related U.S. Application Data

(63) Continuation of application No. 16/562,232, filed on Sep. 5, 2019, now Pat. No. 11,315,558, which is a
(Continued)

(51) Int. Cl.
*G10L 15/22* (2006.01)
*G06F 3/01* (2006.01)
(Continued)

(52) U.S. Cl.
CPC .............. *G10L 15/22* (2013.01); *G06F 3/017* (2013.01); *G06F 3/16* (2013.01); *G06F 3/167* (2013.01);
(Continued)

(58) Field of Classification Search
CPC ... G10L 15/22; G10L 15/26; G10L 2015/223; G06F 3/017; G06F 3/16; G06F 3/167
(Continued)

(56) References Cited

U.S. PATENT DOCUMENTS 6,990,639 B2 1/2006 Wilson
7,987,070 B2 7/2011 Kahn et al.
(Continued)

FOREIGN PATENT DOCUMENTS

WO 2014209221 A1 12/2014

*Primary Examiner* — Susan I McFadden
(74) *Attorney, Agent, or Firm* — Ballard Spahr LLP

(57) ABSTRACT

Methods, apparatuses, computer-readable media, and systems for using voice (e.g., voice commands) to control a plurality of network devices via a motion sensing control device are provided. A control device can detect movement (e.g., a gesture) associated with the control device. The control device can initiate a either a direct or a proxy communication session with a remote computing device. The communication session can be established and maintained for a predefined period such that data associated with a command can be immediately transmitted to the remote computing device. Thus, data associated with the command can be transmitted over the already established communication session to the remote computing device. The remote computing device can provide a response to the control device and/or transmit a command code associated with the voice command to one or more devices intended to be controlled.

25 Claims, 7 Drawing Sheets

Related U.S. Application Data continuation of application No. 15/641,895, filed on Jul. 5, 2017, now Pat. No. 10,453,451.

(51) Int. Cl.
 *G06F 3/16* (2006.01)
 *G10L 15/26* (2006.01)

(52) U.S. Cl.
 CPC ........ *G10L 15/26* (2013.01); *G10L 2015/223* (2013.01)

(58) Field of Classification Search
 USPC ........................................................ 704/275
 See application file for complete search history.

(56) References Cited

U.S. PATENT DOCUMENTS

| | | | |
|---|---|---|---|
| 8,565,820 B2 | 10/2013 | Riemer et al. | |
| 8,724,963 B2 | 5/2014 | Bliss et al. | |
| 9,063,731 B2 | 6/2015 | Heo et al. | |
| 9,094,813 B2 | 7/2015 | Patoskie | |
| 9,176,543 B2 | 11/2015 | Faith et al. | |
| 9,377,867 B2 | 6/2016 | Katz et al. | |
| 9,791,921 B2 * | 10/2017 | Poulos | G06F 3/013 |
| 9,824,558 B2 | 11/2017 | Warren | |
| 9,971,412 B2 * | 5/2018 | VanBlon | G06F 1/1694 |
| 10,453,451 B2 | 10/2019 | Rekstad | |
| 10,715,762 B2 | 7/2020 | Lee et al. | |
| 10,852,917 B2 | 12/2020 | Zurek et al. | |
| 11,315,558 B2 * | 4/2022 | Rekstad | G06F 3/0346 |
| 2010/0053458 A1 | 3/2010 | Anglin et al. | |
| 2012/0239396 A1 | 9/2012 | Johnston et al. | |
| 2013/0179441 A1 | 7/2013 | Kuusik | |
| 2014/0184922 A1 | 7/2014 | Schafer et al. | |
| 2015/0189069 A1 | 7/2015 | Sayed | |
| 2016/0132119 A1 | 5/2016 | Temple | |
| 2018/0004372 A1 | 1/2018 | Zurek et al. | |
| 2019/0013018 A1 | 1/2019 | Rekstad | |
| 2019/0155463 A9 | 5/2019 | Zurek et al. | |

* cited by examiner

METHODS AND SYSTEMS FOR USING VOICE TO CONTROL MULTIPLE DEVICES

CROSS REFERENCE TO RELATED PATENT APPLICATIONS

This application is a continuation of U.S. patent application Ser. No. 16/562,232, filed Sep. 5, 2019, which is a continuation of U.S. patent application Ser. No. 15/641,895, filed Jul. 5, 2017, which are herein incorporated by reference in their entirety.

BACKGROUND

The control of devices traditionally requires manual operation of dials, buttons, keyboards, keypads and the like. Remote controls, often configured with voice control options, can be used to control devices within a line of sight of and/or within close proximity to the remote control. However, not all devices within a network may be within the line of sight of or within close proximity to the remote control. Thus, there may either be an inability to control such devices, and/or a significant delay in controlling such devices. Additionally, a user may be unaware of devices in a network that may be operated via a remote control. These and other shortcomings are addressed by the present disclosure.

SUMMARY

It is to be understood that both the following general description and the following detailed description are exemplary and explanatory only and are not restrictive. Provided are methods and systems for using voice to control multiple devices. In an aspect, a control device (e.g., a remote control, a smartphone, a user device, etc.) can sense handling or movement of the control device and initiate a communication session with a remote computing device (e.g., server) in response to sensing the handling or movement. The control device can listen for a voice input and transmit the voice input to the remote computing device using the initiated communication session. The remote computing device may translate the voice input into a command code for one or more controllable devices (e.g., a television, a set-top box, a stereo, a game console, virtual reality systems, augmented reality systems, home automation devices, etc.). Alternatively, the control device can listen for a voice input, convert the voice input to text, associate the text to a command code for one or more controllable devices, and transmit the command code to the remote computing device. In an aspect, the remote computing device can identify at least one of the one or more controllable devices as a target device, and pass the command code back to the control device for transmission to the target device. In another aspect, the remote computing device can transmit the command code to the one or more controllable devices, thereby bypassing the control device.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
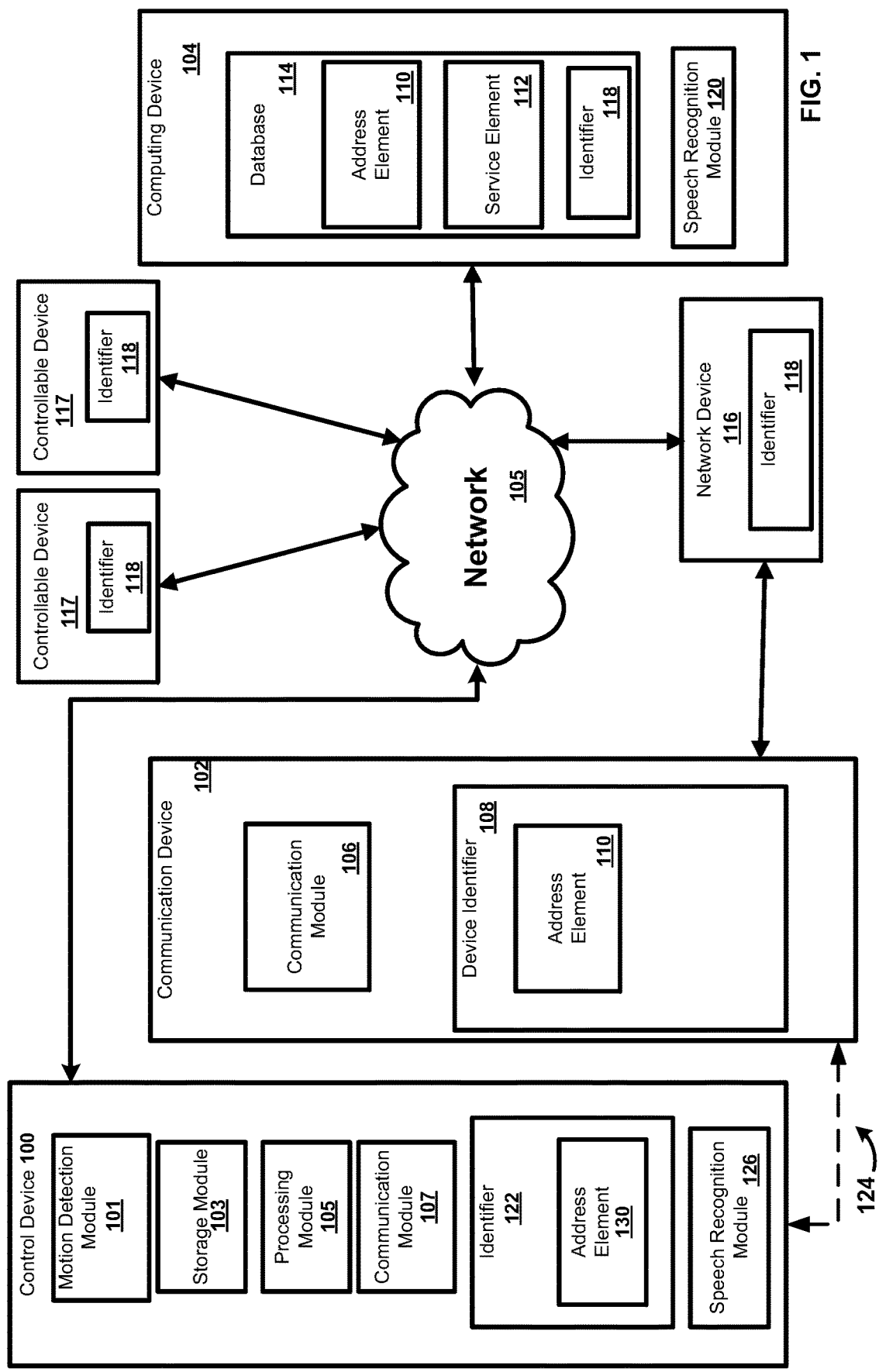
FIG. 1 illustrates various aspects of an exemplary system in which the present methods and systems can operate.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

In various instances, this detailed description may refer to content items (which may also be referred to as "content," "content data," "content information," "content asset," "multimedia asset data file," or simply "data" or "information"). In some instances, content items can comprise any information or data that may be licensed to one or more individuals (or other entities, such as business or group). In various embodiments, content may include electronic representations of video, audio, text and/or graphics, which may include but is not limited to electronic representations of videos, movies, or other multimedia, which may include but is not limited to data files adhering to MPEG2, MPEG, MPEG4 UHD, HDR, 4 k, Adobe® Flash® Video (.FLV) format or some other video file format whether such format is presently known or developed in the future. In various embodiments, the content items described herein may include electronic representations of music, spoken words, or other audio, which may include but is not limited to data files adhering to the MPEG-1 Audio Layer 3 (.MP3) format, Adobe®, CableLabs 1.0, 1.1, 3.0, AVC, HEVC, H.264, Nielsen watermarks, V-chip data and Secondary Audio Programs (SAP). Sound Document (.ASND) format or some other format configured to store electronic audio whether such format is presently known or developed in the future. In some cases, content may include data files adhering to the following formats: Portable Document Format (.PDF), Electronic Publication (.EPUB) format created by the International Digital Publishing Forum (IDPF), JPEG (.JPG) format, Portable Network Graphics (.PNG) format, dynamic ad insertion data (.csv), Adobe® Photoshop® (.PSD) format or some other format for electronically storing text, graphics and/or other information whether such format is presently known or developed in the future. In some embodiments, content items may include any combination of the above-described examples.

In various instances, this detailed disclosure may refer to consuming content or to the consumption of content, which may also be referred to as "accessing" content, "providing" content, "viewing" content, "listening" to content, "rendering" content, or "playing" content, among other things. In some cases, the particular term utilized may be dependent on the context in which it is used. For example, consuming video may also be referred to as viewing or playing the video. In another example, consuming audio may also be referred to as listening to or playing the audio.

Note that in various instances this detailed disclosure may refer to a given entity performing some action. It should be understood that this language may in some cases mean that a system (e.g., a computer) owned and/or controlled by the given entity is actually performing the action.

In one aspect, the present disclosure relates to using voice input (e.g., voice commands) to control a plurality of controllable devices using a control device having touch and motion sensing capabilities. The disclosed systems and methods can detect an action such as an input (e.g., a touch of a button), and/or a movement (e.g., a gesture) associated with a control device and, based on the action satisfying a predefined condition, initiate a communication session with a remote computing device. In one aspect, the communication session can be initiated before receiving any input from a user of the control device. For example, based on the touch or movement of the control device, the communication session can be automatically established and maintained for a predefined period such that subsequent commands associated with the control device (e.g., voice commands, tactile commands, etc.) can be immediately transmitted to the remote computing device. Additionally, based on the touch or movement of the control device, features can be activated on the control device itself, such as activating a sensor (e.g., a microphone) to receive input from a user (e.g., voice input). In an aspect, the control device can be configured to recognize voice input and determine if the voice input comprises an operational command for one or more controllable devices (e.g., a television, a set-top box, a stereo, a game console, etc.). As an example, the control device can comprise one or more speech recognition modules configured to interpret the voice input. The control device can extract from the voice input one or more operational commands (e.g., power on, power off, volume up, volume down, channel up, channel down, play, pause, search for content, and the like) and, in some aspects, one or more identifiers of the one or more controllable devices. The control device can transmit data indicative of the voice input and/or operational commands to the remote computing device via the communication session. As an example, the control device can comprise one or more transceivers for establishing the communication session with the remote computing device, such as a cellular communication session, a satellite communication session, a WiFi communication session, and the like. In an aspect, the control device can initiate a communication session with a communication device (e.g., gateway, mobile phone, laptop, etc.) via a short-range communication technique (e.g., BLUETOOTH, ZigBee, RF4CE) and utilize the communication device to transmit data indicative of the voice input and/or operational command to the remote computing device via a long-range communication technique (e.g., cellular, satellite, and the like).

In another aspect, the control device does not interpret the voice input. Instead of the control device extracting from the voice input one or more operational commands, the control device can transmit data indicative of the voice input to the remote computing device via the communication session. The remote computing device can be configured to recognize the voice input and determine if the voice input comprises an operational command for one or more controllable devices (e.g., a television, a set-top box, a stereo, a game console, etc.). For example, the remote computing device can comprise one or more speech recognition modules configured to interpret the voice input. The remote computing device can extract from the voice input one or more operational commands (e.g., power on, power off, volume up, volume down, channel up, channel down, play, pause, search for content, and the like) and, in some aspects, one or more identifiers of the one or more controllable devices.

In an aspect, the remote computing device can determine one or more command codes associated with the one or more operational commands and/or the one or more identifiers of controllable devices. A command code can comprise a binary command used by an infrared transmitter to effect the operational command (e.g., 0010010 for volume up) by emitting a series of light pulses that corresponds to the binary command. A command code can comprise a command in compliance with one or more standards such as Audio/Video Remote Control Profile (AVRCP). As another example, the command code can comprise a Uniform Resource Locator (URL). The URL can point to a location for data (e.g., a source of content or look up instruction in database 114) or point to a location for data with additional parameters to effect an action by an appropriate controllable device(s), such as to play the content. In an aspect, the one or more command codes can be transmitted by the remote computing device back to the control device for the control device to transmit to the appropriate controllable device(s). In another aspect, the one or more command codes can be transmitted by the remote computing device to the appropriate controllable device(s), bypassing the control device. In a further aspect, the one or more operational commands and/or the one or more identifiers of controllable devices can be transmitted to the control device without further processing by the remote computing device. The control device can be configured to determine the one or more command codes associated with the one or more operational commands and/or the one or more identifiers of controllable devices and transmit the one or more command codes to the appropriate controllable device(s) to effect the operational command.

In one aspect of the disclosure, a system can be configured to provide services such as device control-related services. FIG. 1 illustrates various aspects of an example environment in which the present methods and systems can operate. Those skilled in the art will appreciate that present methods may be used in various types of networks and systems that employ both digital and analog equipment. One skilled in the art will appreciate that provided herein is a functional description and that the respective functions can be performed by software, hardware, or a combination of software and hardware.

The example environment can comprise a control device 100 (e.g., a remote control, a smartphone, a tablet, a mobile device, a user device, etc.). In an aspect, the control device 100 can comprise a motion detection module 101 for detecting a motion and/or input associated with the control device 100 such as a touch or movement (e.g., movement of the device, picking up of the device, a gesture, button presses, etc.). A gesture can involve a change in orientation or spatial location of the control device 100. Further examples of detected motions and inputs can include a user speaking near the control device 100, the user pressing a key or button of the control device 100, the user walking or moving with the control device 100, and the user picking up the control device 100 from a surface or storage location. Additionally, examples of detected motions and inputs can include the user placing the control device 100 onto a surface or into a storage location, a proximity of the user's fingers being close to a display of the control device 100, the user shaking the control device 100, the user raising the control device 100 to the user's mouth, the user tilting the control device 100 down, the user tilting the control device 100 up, combinations thereof, and the like. The motion detection module 101 may include one or more sensors, operating alone or in combination, such as a light sensor, a pressure sensor, a gyroscopic sensor, an accelerometer, a touch-screen proximity sensor, a fingerprint sensor, a haptic sensor, a digital compass, a microphone, combinations thereof, and the like.

The control device 100 can store the one or more predefined motions (e.g., gestures) in a storage module 103. A predefined motion (e.g., gesture) can be defined, relative to the control device, by a specific motion from a starting point to an ending point and all points between, a specific relative starting orientation to a final orientation and all orientations in between, a speed of motion, combinations thereof, and the like. The predefined motion (e.g., gesture) can represent, for example, the user walking or jogging with the control device 100, the user picking up the control device 100 from a surface or storage location, the user placing the control device 100 onto a surface or into a storage location, a proximity of the user's fingers being close to a display of the control device 100, the user shaking the control device 100, the user raising the control device 100 to the user's mouth, the user tilting the control device 100 down, the user tilting the control device 100 up, combinations thereof, and the like.

The control device 100 can also comprise a processing module 105 for determining, interpreting, translating, and/or analyzing the output of the motion detection module 101. For example, the processing module 105 can determine if an output of the motion detection module 101 represents a predefined amount of movement or pressure, such as in response to a gesture. The processing module 105 can receive output from the motion detection module 101 and compare the output to the one or more predefined gestures stored in the storage module 103.

When sufficient pressure or movement, e.g., a predefined gesture, is identified, the processing module 105 can execute one or more functions. The one or more functions can comprise, activating one or more of the sensors (e.g., sensors operating alone or in combination) of the motion detection module 101, activating one or more sensors (e.g., sensors operating alone or in combination) separate from the motion detection module 101, and activating (e.g., initiating) one or more buttons or controls associated with the control device 100. The one or more functions can comprise initiating and/or establishing a communication session with a communication device 102 and/or a computing device 104 via a communication module 107. For example, based on the touch or movement of the control device, the communication session can be automatically established and maintained for a predefined period such that subsequent commands associated with the control device (e.g., voice commands, tactile commands, etc.) can be immediately transmitted to the remote computing device. Additionally, the one or more functions can comprise receiving input from one or more sensors, transmitting the received input from the one or more sensors to the communication device 102 and/or a computing device 104 via the communication module 107, combinations thereof, and the like.

In an aspect, upon identifying a detected motion (e.g., gesture) as a predefined gesture, the processing module 105 can activate one or more of the sensors (either a sensor of the motion detection module 101 and/or a separate sensor). As an example, the processing module 105 can activate a microphone upon identifying the detected motion of the user moving the control device 100 to the user's mouth (thus indicating a likelihood that the user wishes to provide a voice input/voice command). The activated sensor can receive input, for example, voice input from the user, and provide the voice input to a speech recognition module 126.

The speech recognition module 126 can process the voice input. The speech recognition module 126 can perform speech-to-text operations that translate spoken words (e.g., voice input) into text, other characters, or commands. The speech recognition module 126 can apply one or more voice recognition algorithms to the voice input to extract a word or words (e.g., phrase). The speech recognition module 126 can be configured to convert the word or words to text and compare the text to a list of words stored in storage module 103. The control device 100 can associate/map the text to one or more operational commands stored in the storage module 103. As such, the control device 100 can determine operational commands from the voice input.

In an aspect, the speech recognition module 126 can process the voice input by analyzing one or more voice characteristics associated with the voice input. Voice characteristics can comprise a tone, an inflection, rate of speech, volume of speech, specific phrases and/or any or such characteristic associated with speech. The speech recognition module 126 can be configured to identify and store (e.g., via storage module 103) voice characteristics. For example, the speech recognition module 126 can identify and store voice characteristics whenever the control device 100 is in a "learn" or "discovery" mode, during an initial setup of the control device 100, based to repeated use of the control device 100, combinations thereof, and the like. The voice characteristics can be associated with a particular user and/or one or more operational commands. The operational commands may be stored (e.g., via storage module 103) such that each operational command is associated with a command code. The command code can be associated with the control device 100 and/or one or more controllable devices such as controllable device 117. One or more user settings can be enabled to permit a user to indicate which controllable device should respond to which command code. The control device 100 can be configured to transmit the command code to the one or more controllable devices, the computing device 104, any device associated with a network (e.g., network 105), combinations thereof, and the like.

In another aspect, the activated sensor on the control device 100 can receive voice input from the user and provide the voice input, or a data representation of the voice input, to the processing module 105. The processing module 105 can be configured to associate predefined motion (e.g., gesture) with functions of the control device 100. By associating predefined gestures with functions of the control device 100, the control device 100 can determine (e.g., predict) when a user is likely to press a button (real or virtual) associated with the control device 100 and/or which button the user is likely to press. As such, the predefined motions (e.g., gestures) can be associated with state data and sensor data. The state data and the sensor data can be stored in storage module 103. The state data can reference a state of the control device 100 (e.g., device on, device off, device orientation, etc.) and the sensor data can be associated with inputs sensed by the one or more sensors (e.g., sensors operating alone or in combination) of the control device 100. The processing module 105 can be configured to process one or more rules (e.g., logic) and/or probabilistic models associated with the state data and the sensor data. A probabilistic model can be based on pattern recognition and/or machine learning. The one or more rules and/or probabilistic models can be used to determine, based on applying the rules or the probabilistic models to the state data and/or the sensor data, that a user of the control device 100 is likely to initiate an action, such as a button press (either real or virtual), for example. Based on the likeliness of the user initiating a button press, the control device 100 can invoke one or more functions of the control device 100, such as initiating an action and/or a response associated with pressing the button (e.g., activate the button). As an example, the control device 100 can be configured such that if a user routinely performs a gesture (e.g., tilts the control device down) before pressing a button (e.g., pressing a "channel up" button), the control device 100 can initiate a pressing of the button (e.g., activate the button) based on detection of the motion (e.g., gesture), without the user having to actually press the button.

In another aspect, upon identifying sufficient movement or touching of the control device, and/or a detected gesture as a pre-defined gesture, the processing module 105 can establish, or initiate establishing a communication session with the communication device 102 and/or a computing device 104 over a network 105 via the communication module 107. The communication session can be initiated/established without further input or instruction from a user. The processing module 105 can thus transmit data indicative of the voice input to the computing device 104. The communication module 107 can comprise a transceiver configured for communicating information using any suitable wireless technique/protocol, for example WiFi (IEEE 802.11), BLUETOOTH®, cellular, satellite, infrared, or any other suitable wireless standard. For example, the communication module 107 can communicate with the communication device 102 via Bluetooth® such that the communication device 102 can establish the communication session 124 with the computing device 104 on behalf of the control device 100. For example, based on touch or movement of the control device, a communication session can be automatically established and maintained for a predefined period such that subsequent commands associated with the control device 100 (e.g., voice commands, tactile commands, etc.) can be immediately transmitted to the computing device 104. By way of further example, the communication module 107 can communicate with a controllable device 117. The controllable device 117 can be in communication with a network such as a network 105. The network 105 can be a network such as the Internet, a wide area network, a local area network, a cellular network, a satellite network, and the like. Other forms of communications can be used such as wired and wireless telecommunication channels, for example. As an example, a network device 116 can facilitate the connection of a device, such as the control device 100 and/or the communication device 102, to the network 105. The network device 116 can be configured as a wireless access point (WAP).

In an aspect, the network device 116 can be configured to allow the control device 100 and/or the communication device 102 to connect to the network 105 using Wi-Fi, Bluetooth or any desired method or standard, be it wireless or wired. As an example, the control device 100 can connect to the computing device 104 by establishing a communication session with the computing device 104 through the network device 116. The control device 100 can activate the communication module 107 (which can be in a low or no power state by default to conserve power) which can connect to a wireless network provided by the network device 116 using predetermined user credentials such as SSID, username, password, combinations thereof, and the like. By way of another example, the control device 100 can connect to the computing device 104 by establishing a communication session (e.g., pairing) with the communication device 102. The control device 100 can activate the communication module 107 (which can be in a low or no power state by default to conserve power) which can pair the control device 100 with the communication device 102 using predetermined user credentials such as BLUETOOTH device address, username, password, combinations thereof, and the like. The control device 100 can then utilize communication functionality of the communication device 102 to establish a communication session with the computing device 104 (either directly through the network 105 or via the network device 116 and then through the network 105). In an aspect, based on touch or movement of the control device, the communication session can be automatically established and maintained for a predefined period such that subsequent commands associated with the control device 100 (e.g., voice commands, tactile commands, etc.) can be immediately transmitted to the computing device 104.

In an aspect, control device 100 can be associated with a device identifier 122. As an example, the device identifier 122 can be any identifier, token, character, string, or the like, for differentiating one control device (e.g., control device 100, remote control, smartphone, tablet, mobile device, user device, etc.) from another control device. In a further aspect, the device identifier 122 can identify a control device as belonging to a particular class of control devices. As a further example, the device identifier 122 can comprise information relating to the control device such as a manufacturer, a model or type of device, a service provider associated with the control device 100, a state of the control device 100, a locator, and/or a label or classifier. Other information can be represented by the device identifier 122. Other information can be represented by the device identifier 122. In an aspect, the device identifier 122 can comprise an address element 130. In an aspect, the address element 130 can comprise or provide an internet protocol address, a network address, a media access control (MAC) address, an Internet address, or the like. As an example, the address element 130 can be relied upon to establish a communication session between the communication device 102 and/or the computing device 104 or other devices and/or networks. As a further example, the address element 130 can be used as an identifier or locator of the control device 100. In an aspect, the address element 130 can be persistent for a particular network. The processing module 105 can transmit the device identifier 122 with the voice input to the communication device 102 and/or the computing device 104.

In an aspect, the communication device 102 can be an electronic device such as a user device, mobile device, computer, a smartphone, a laptop, a tablet, a set-top box, a display device, or other device capable of communicating with a computing device 104 and the control device 100. As an example, the communication device 102 can comprise a communication module 106. The communication module 106 can comprise a transceiver configured for communicating information using any suitable wireless protocol, for example WiFi (IEEE 802.11), BLUETOOTH®, cellular, satellite, infrared, or any other suitable wireless standard. The communication module 106 can transmit data to a local or remote device such as the computing device 104 and/or the control device 100.

In an aspect, the communication device 102 can be associated with a user identifier or device identifier 108. As an example, the device identifier 108 can be any identifier, token, character, string, or the like, for differentiating one user or communication device (e.g., communication device 102) from another user or communication device. Other information can be represented by the device identifier 108. In an aspect, the device identifier 108 can comprise an address element 110. In an aspect, the address element 110 can comprise or provide an internet protocol address, a network address, a media access control (MAC) address, an Internet address, or the like. As an example, the address element 110 can be relied upon to establish a communication session between the communication device 102 and/or the computing device 104 or other devices and/or networks. As a further example, the address element 110 can be used as an identifier or locator of the user device 102. In an aspect, the address element 110 can be persistent for a particular network.

The computing device 104 can be a server for communicating with the control device 100 and/or the communication device 102. In an aspect, the computing device 104 can communicate with the control device 100 and/or the communication device 102 for exchanging data.

In an aspect, the computing device 104 can manage the communication between the control device 100, the communication device 102, and a database 114 for sending and receiving data therebetween. As an example, the database 114 can store a plurality of command codes, operational codes, identifiers, profiles, or other information. As a further example, the user device 102 can request and/or retrieve a file from the database 114 on behalf of the control device 100. As an example, the computing device 104 can obtain the identifier 122 from the control device 100 through the communication device 102 and retrieve information from the database 114 such as a profile associated with the identifier 122. The profile can comprise, for example, a list of one or more controllable devices associated with the identifier 122 (e.g., representing the various controllable devices a user may have installed at home or other location), one or more identifiers associated with the one or more controllable devices, one or more command codes (mapped to one or more operational commands) associated with the one or more controllable devices, one or more user preferences, and the like. An operational command can comprise an instruction intended to cause a change in operational state of a controllable device (e.g., power on, power off, volume up, volume down, channel up, channel down, play, pause, and the like). A command code can comprise a computer executable instruction to effect the operational command. As an example, the command code can comprise a binary command. The binary command can be transmitted and/or provided to a device, to effect an operation of the device (e.g., 0010010 for volume up, 0010001 for channel up, etc.). As another example, the command code can comprise a Uniform Resource Locator (URL). The URL can point to a location for data (e.g., a source of content or look up instruction in database 114) or point to a location for data with additional parameters to affect an action, such as to play the content. The URL can be transmitted and/or provide to a device to effect an operation of the device (e.g., search for content, play content, etc.).

In an aspect, a signal corresponding to a binary command and/or URL can be transmitted to a device (e.g., controllable device 117). As an example, the command code can be transmitted either by a short-range communication technique (e.g., infrared technology, BLUETOOTH®, near-field communication, and the like) or a long-range communication technique (e.g., Internet, cellular, satellite, and the like). As an example of a short-range communication technique for transmitting command codes, the command code can be transmitted by an infrared transmitter such that a series of light pulses are emitted that correspond to the binary command. As an example of a long-range communication technique for transmitting command codes, the binary code and/or URL can be compiled in a digital signal transmitted over a high-speed digital connection (e.g., Internet). A command code can comprise a command in compliance with one or more standards such as Audio/Video Remote Control Profile (AVRCP). The one or more user preferences can be one or more rules establishing a manner in which the user wishes commands to be applied. For example, a user may have more than one controllable device capable of producing audio (e.g., television speakers and a sound bar), however, the user only wishes to have audio produced by a specific controllable device (e.g., sound bar only). Thus, an operational command for volume up would be interpreted according to the user preferences as being directed to the sound bar. In an aspect, a user preference can be a default source of content. As an example, the user preference can be an operational command to start playing music sourced from a preferred online library or local storage. In an aspect, a user preference can be a predetermined measure to skip forward (e.g., 30 seconds, etc.) based on an operational command. As an example, a voice input of "skip forward" and/or an associated operational command can cause an appropriate controllable device(s), currently playing content, to advance the content in increments of 30 seconds and/or to the end of commercials associated with the content. The database 114 can be integrated with the computing device 104 or some other device or system.

In an aspect, the computing device 104 can comprise a speech recognition module 120. The speech recognition module 120 can receive the data indicative of the voice input (e.g., from the control device 100 or from the control device 100 via the communication device 102) and apply one or more voice recognition algorithms to the voice input to extract a word or words (e.g., phrase). The speech recognition module 126 can convert the word or words to text and compare the text to a list of words stored in database 114. The computing device 104 can associate/map the text to one or more operational commands stored in the database 114. As such, the computing device 104 can determine operational commands from the voice input.

In an aspect, the speech recognition module 120 can process the voice input by analyzing one or more voice characteristics associated with the voice input. Voice characteristics can comprise a tone, an inflection, rate of speech, volume of speech, specific phrases and/or any or such characteristic associated with speech. The speech recognition module 120 can be configured to identify and store (e.g., via database 114) voice characteristics. The voice characteristics can be associated with a particular user and/or one or more operational commands. The operational commands may be stored (e.g., via database 114) such that each operational command is associated with a command code. The command code can be associated with the control device 100, the computing device 104, and/or one or more controllable devices such as controllable device 117. One or more user settings can be enabled to permit a user to indicate which controllable device should respond to which command code. The computing device 104 can be configured to transmit the command code to the one or more controllable devices, the control device 100, any device associated with a network (e.g., network 105), combinations thereof, and the like.

Figure 2:
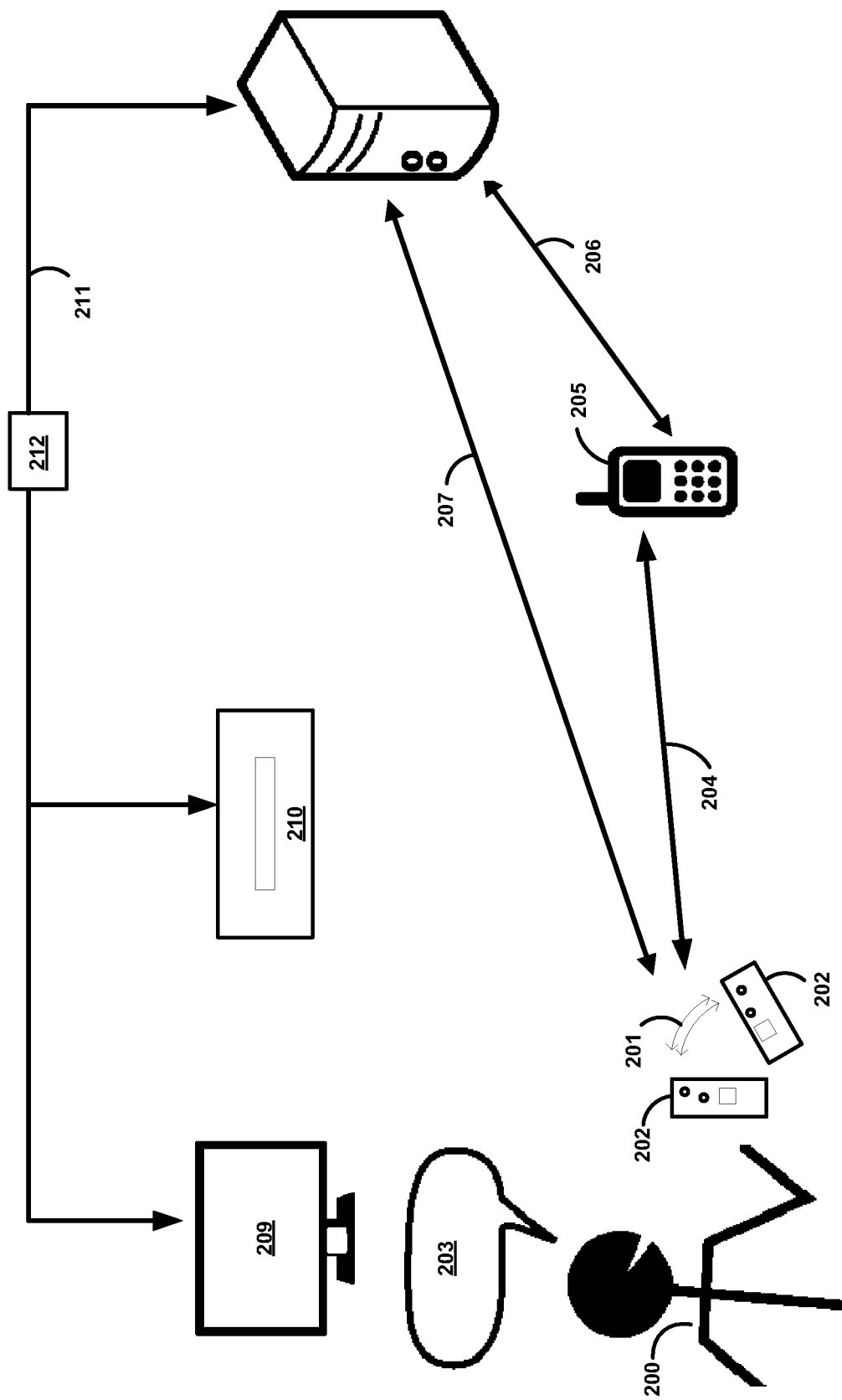
FIG. 2 is a view illustrating a process for using a control device.

FIG. 2 is a view illustrating a process to control multiple devices. To control one or more controllable devices (e.g., a television, a set-top box, a stereo, a game console, virtual reality systems, augmented reality systems, home automation devices, etc.), a user 200 can touch and/or perform a gesture 201 associated with a control device 202 (e.g., a remote control). As shown, the gesture can be the user 200 raising the control device to the user's mouth, indicating a likelihood that the user wishes to provide a voice input. The control device 202 can detect the gesture 201 and determine if a predefined condition is satisfied. In an aspect, the condition can be predefined such that one or more requirements must be satisfied before an action associated with the control device 202 can occur or be performed. In an aspect, a condition can be satisfied if a threshold is not met, met, and/or exceeded. As shown, moving (e.g., 201) the control device 202 can satisfy a predefined condition of movement of the control device 202 from a stationary position. Thus the movement (e.g., 201) can qualify as the gesture.

In another aspect, the control device 202 can associate a detected gesture (e.g., gesture 201) with functions, buttons and/or other components of the control device 202. By associating the gesture with functions, buttons and/or other components of the control device 202, the control device 202 can determine when a user is likely to perform an action associated with the functions, buttons and/or other components of the control device 202 such as a button press (real or virtual), for example. As another example, by associating the gesture with functions, buttons and/or other components of the control device 202, the control device 202 can determine which button the user is likely to press. Based on the likeliness of the user pressing the button, the control device 202 can initiate an action and/or a response associated with pressing the button, such as associating the button press with a command code. In an aspect, command codes can be associated with controllable devices, such as a television 209 and/or a set-top box 210. The command codes associated with the detected gesture can be used to control the operation of the television 209 and/or the set-top box 210. As an example, the control device 202 can be configured such that if a user routinely performs a gesture (e.g., tilts the control device down) before pressing a button (e.g., pressing a "channel up" button), based on pattern recognition, the gesture can be used to predictively press a button associated with the controllable device 202. Ultimately, the predictively pressed button, via associated command codes, can control the television 209 and/or a set-top box 210.

In another aspect, the control device 202 does not associate the gesture 201 with functions, buttons and/or other components of the control device 202. Instead, responsive to the control device 202 detecting the gesture 201, the control device 202 can activate a sensor associated with the control device. As an example, the control device can activate a microphone (not shown) configured with the control device 202 in response to detecting the gesture 201. The activate microphone (not shown) can receive a voice input 203 from the user. The control device 202 can perform speech-to-text operations that translate spoken words (e.g., voice input) into text, other characters, or commands. As an example, the control device 202 can extract a word or words (e.g., phrase) from the voice input 203. The control device 202 can convert the word or words to text that can be associated with one or more operational commands. As such, the control device 202 can determine operational commands from the voice input. Ultimately, the operational commands can be used to control device such as the television 209 and/or a set-top box 210.

In another aspect, the control device 202 does not have to translate the voice input 203 to operational commands. Instead, responsive to detecting the gesture 201, the control device 202 can establish a communication session. A short-range communication session 204 can be established between the control device 202 and a mobile device 205 (e.g., a smartphone). The communication session 204 can employ a short-range communication technique (e.g., BLUETOOTH) and utilize the mobile device 205 to transmit a voice input 203 to a server 208 via communication session 206. The communication session 206 can employ a long-range communication technique (e.g., cellular, satellite, and the like). The control device 202 can establish the communication session 206 by activating a wireless transceiver (not shown) configured on the mobile device 205 after the control device 202 is in communication with the mobile device 205 via communication session 204. Alternatively, the control device 202 can establish a communication session 207 between the control device 202 and the server 208 responsive to detecting the gesture 201. In an aspect, the communication session 207 can be facilitated via a wireless transceiver configured on the control device 202. In an aspect, based on touch or movement of the control device 202, the communication session can be automatically established and maintained for a predefined period such that subsequent commands associated with the control device (e.g., voice commands, tactile commands, etc.) can be immediately transmitted to the server 208.

After, prior to, or concurrent with, establishing the communication session (e.g., 204, 206, and 207), the control device 200 can utilize a microphone (not shown) to receive the data indicative of the voice input 203 from the user 200. The user 200 can say an operational command, such as "volume up" which will become the voice input 203. The control device 200 can transmit data indicative of the voice input to the server 208 via the communication session (e.g., 204, 206, and 207). The server 208 can be configured for speech recognition such that the server can recognize the voice input 203 and determine if the voice input 203 comprises an operational command. In an aspect, the voice input 203 can comprise basic operational commands such as "power on", "power off", "volume up", "volume down", "channel up", "channel down", "play", "pause", and the like. The operational command can be associated with one or more controllable devices (e.g., television 209, set-top box 210). The operational commands can be associated with command codes. As previously mentioned, command codes can be associated with a controllable device 117, such as a television 209 and/or a set-top box 210. The command codes associated with the operational commands can be used to control the operation of the television 209 and/or the set-top box 210).

After determining that the voice input 203 comprises an operational command, the server 208 can determine devices (e.g., a plurality of target devices, television 209, set-top box 210) associated with the control device 202. Determining devices associated with the control device 202 can be performed by the server 208 by relating an identifier associated with the control device 202 to identifiers associated with the devices (e.g., an identifier associated with television 209, an identifier associated with set-top box 210). The server 208 can relate the identifier associated with the control device 202 to identifiers associated with devices by querying a database accessible by the server 208 and determining a relationship between the identifiers exists by virtue of the identifiers being stored in a user profile.

In an aspect, after determining devices associated with the control device 202 (e.g., television 209, set-top box 210), the server 208 can transmit a signal to the devices that changes the state of the devices. The transmitted signal can cause the state of an appropriate device(s) to change from an inactive (e.g., hibernation) state where operation/functionality of the device(s) has been reduced, to an active state where the operation/functionality of the device(s) is at optimal and/or at an ideal capacity. As an example, a predefined gesture and/or voice input (e.g., voice input 203) can be detected by the control device 202, provided to the server 208, associated with television 209 and/or set-top box 210, and associated with a signal transmitted to the television 209 and/or the set-top box 210. The transmitted signal can cause the television 209 and/or the set-top box 210 to transition from an inactive to an active state (e.g., causes the device(s) to "wake up").

In another aspect, after determining devices associated with the control device 202, the server 208 can determine that one or more controllable devices associated with the control device 202 are also associated with the operational command. Thus, server 208 can be configured to associate/map operational commands with/to command codes used for controlling the devices (e.g., television 209, set-top box 210). The server 208 can be configured to associate the operational commands to the command codes, and associate the command codes with the devices (e.g., television 209, set-top box 210). An association between the devices and the operational command can indicate that the devices are configured such that the command code can be executed by the devices (e.g., television 209, set-top box 210).

After determining that one or more controllable devices associated with the control device 202 are also associated with the operational command, the server 208 can transmit the command code associated with the operational command to the one or more controllable devices (e.g., television 209, set-top box 210) to be executed by the one or more controllable devices. Additionally, an indication of the operational command can be transmitted from the server 208 to the control device 202 as feedback/confirmation of reception of the data indicative of the voice input 203. The indication can be transmitted from the server 208 to the control device 202 via the communication session (e.g., 204, 206, and 207). Alternatively, after transmitting the command code associated with the operational command to the one or more controllable devices to be executed by the one or more controllable devices, an indication of the operational command is not transmitted from the server 208 to the control device 202 as feedback/confirmation of reception of the data indicative of the voice input 203 and/or in relation to successful/failed execution of the operational command by the one or more controllable devices. In an aspect, after receiving the indication comprising the command code(s) associated with the devices (e.g., television 209, set-top box 210), the control device can transmit the command code to the devices to effect the operation by the devices based on the command code. Alternatively, the server 208 can transmit the command codes to the devices such that the devices can execute the command code. The server 208 can transmit the command codes to the devices via a communication path 211. The communication path 211 can employ a long-range communication technique (e.g., cellular, satellite, and the like) and can be facilitated by a network device and/or access point 212 (e.g., FIG. 1, network device 116) to which the devices and the server 208 are connected.

Figure 3:
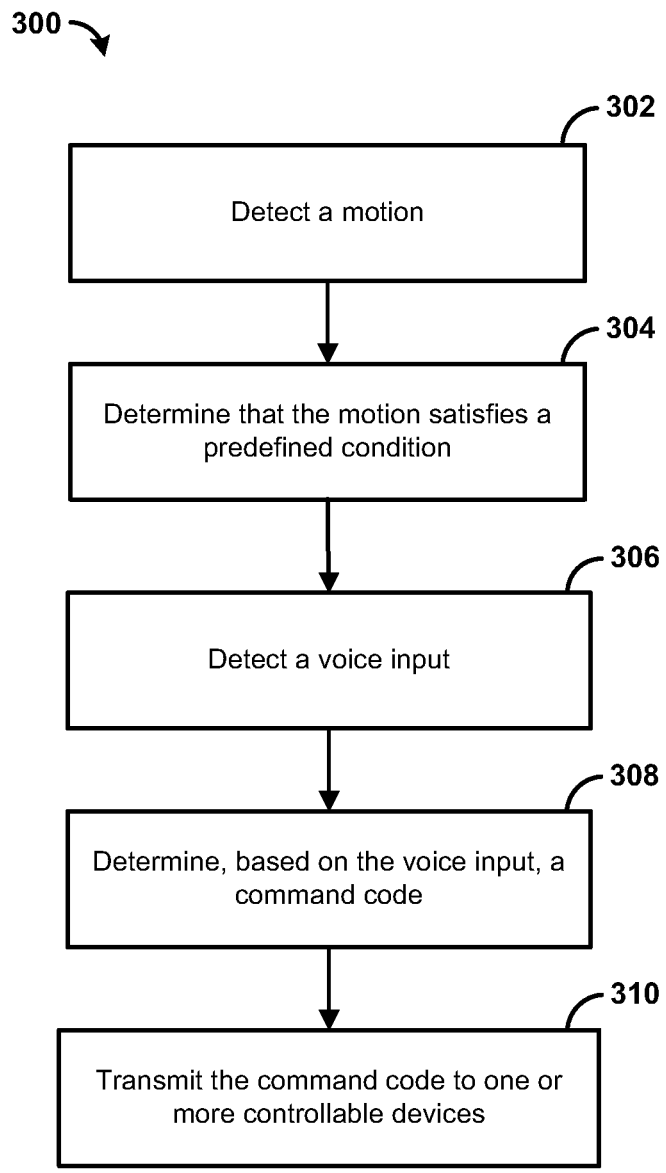
FIG. 3 is a flowchart illustrating an example method for using voice to control devices.

FIG. 3 is a flowchart illustrating an example method 300. At step 302, a control device (e.g., control device 100, a remote control, a smartphone, a tablet, a mobile device, a user device, etc.) can detect a motion (e.g., a gesture, movement) associated with the control device. A motion can involve a change in orientation or spatial location of the control device. For example, a motion can involve, a user picking up the control device from a surface or storage location, the user placing the control device onto a surface or into a storage location, a proximity of the user's fingers being close to a display of the control device, the user raising the control device to the user's mouth, the user tilting the control device down, the user tilting the control device up, combinations thereof, and the like. Additionally, motions (e.g., gestures) associated with the control device can include a slow shaking, rapid shaking, long movement (one direction), short movement, fast movement, slow movement, etc., of the control device. More complex motions (e.g., gestures) could include axial movement, such that a left to right horizontal movement of the control device, or a circular motion of the control device, while either holding down a button or preselecting the button. Thus, a wide variety of simple and complex motions are contemplated. Other types of motions (e.g., gestures) and actions that could be associated with those motions will be apparent to a person skilled in the art and all such gestures are intended to be encompassed herein.

The control device can use one or more sensors (e.g., sensors operating alone or in combination) to detect the motion (e.g., gesture), such as an accelerometer, a gyroscopic sensor, a tilt sensor, a device for measuring eye movement, a pressure sensor, a touch-screen proximity sensor, a fingerprint sensor, a haptic sensor, a digital compass, combinations thereof, and the like.

At step 304, the control device can determine that the motion (e.g., gesture) satisfies a predefined condition. The motion can be processed by the control device to determine if a predefined condition is satisfied. In an aspect, a condition can be predefined such that one or more requirements must be satisfied before an action associated with the control device can occur or be performed. For example, a condition can be satisfied if a threshold is not met, met, and/or exceeded. Alternatively, the condition may not be satisfied if the threshold is not met, met, and/or exceeded. The threshold can be based on measurable parameters that differentiate a motion path of the control device when the control device is picked up, the speed of movement associated with the control device, the orientation of the control device when used (e.g., aimed at a television, pointed up, proximity to a user, etc.), a combination thereof, and the like. As another example, the condition can be associated with specific motion when pressing and/or swiping buttons, key, etc.

In an aspect, the control device can be configured for pattern recognition. The control device can be configured for pattern recognition such that a movement associated with a press of a button, either real or virtual, configured with the control device can be anticipated by the control device. As an example, an upward movement of the control device can be associated with a press (e.g., activation) of a button that is further associated with an operational command. As such, the control device can be configured such that the upward movement of the control device can effectuate a button press associated with an operational command for "channel up" prior to a user actually pressing a "channel up" button configured on the control device. Additionally, the control device can be configured for pattern recognition such that a particular user of the control device can be identified based on frequent or routine occurrences of the motion (e.g., gesture).

A predefined motion (e.g., gesture) can be defined, relative to the control device, by a specific motion from a starting point to an ending point and all points between, a specific relative starting orientation to a final orientation and all orientations in between, a speed of motion, combinations thereof, and the like.

In an aspect, the motion may not be required to satisfy a predefined condition and/or the motion may not be predefined. Instead, an occurrence of the motion (e.g., gesture) can trigger and/or enable an action associated with the control device to occur or be performed (e.g., activating one or more of the sensors, initiating a communication session, maintaining a communication session for a predefined period, etc.).

At step 306, in response to the motion (e.g., gesture) satisfying the predefined condition, the control device can detect a voice input. As an example, the control device can use one or more sensors (e.g., sensors operating alone or in combination) to detect a voice input. Sensors used to detect the voice input can include a microphone, a voice sensor, combinations thereof, and the like. In an aspect, the voice input can comprise basic operational commands such as "power on", "power off", "volume up", "volume down", "channel up", "channel down", "play", "pause", and the like. In an aspect, the voice input can comprise complex and/or detailed operational commands associated with one or more controllable devices (e.g., set top boxes, televisions, radios, game consoles, computing devices 104, controllable device 117, etc.), such as natural language commands, for example. The operational commands can be used to control the operation of the one or more controllable devices. In an aspect, the operational commands can comprise device characterizations. The device characterizations are labels that can be associated with the one or more controllable devices. Alternatively, the device characterizations can be associated with functions that are relative to one or more devices (e.g., controllable device 117, control device 100, computing device 104, etc.), but are not specific to a particular device. As such, the device characterization can provide and understanding of the device or command. For example, a device characterization for a television may include "TV" or "Television" to reflect a class or type of device. Further, device characterizations associated with the television can include "living room TV." Device characterizations may be associated with functions relative to one or more controllable devices, such as the television. For example, a characterization of "brighter" can apply to a function of increasing the brightness of the television screen. In an aspect, the device characterizations can be based on one or more user preferences. As such, the device characterization can comprise one or more rules establishing a manner in which the user wishes operational commands to be applied. For example, a user may have more than one controllable device capable of producing audio (e.g., television speakers and a sound bar), however, the user only wishes to have audio produced by a specific controllable device (e.g., sound bar only). Thus, an operational command "volume up" can be interpreted according to the user preferences as being directed to the sound bar.

At step 308, the control device can determine, based on the voice input, a command code. The control device can perform speech-to-text operations that translate the voice input into text, other characters, or commands. The control device can apply one or more voice recognition algorithms to the voice input to extract a word or words (e.g., phrase). The control device can convert the word or words to text and compare the text to a list of stored words. The control device can associate/map the text to one or more operational commands. As such, the control device can determine operational commands from the voice input. The operational commands may be stored such that each operational command is associated with a command code. The command code can be associated with the control device and/or one or more controllable devices (e.g., controllable device 117). One or more user settings can be enabled to permit a user to indicate which controllable device should respond to which command code. The control device can transmit the command code to the one or more controllable devices.

Alternatively, the control device can determine, based on the voice input, a command code by analyzing one or more voice characteristics associated with the voice input. Voice characteristics can comprise a tone, an inflection, rate of speech, volume of speech, specific phrases and/or any or such characteristic associated with speech. The control device can identify and store voice characteristics. For example, the control device can identify and store voice characteristics whenever the control device is in a "learn" or "discovery" mode, during an initial setup of the control device, based to repeated use of the control device, combinations thereof, and the like. The voice characteristics can be associated with a particular user and/or one or more operational commands. The operational commands may be stored such that each operational command is associated with a command code. One or more user settings can be enabled to permit a user to indicate which controllable device should respond to which command code.

The command code can comprise a binary command. The binary command can be transmitted to the one or more controllable devices (e.g., controllable device 117), to affect the operation of the one or more controllable devices (e.g., 0010010 for volume up, 0010001 for channel up, etc.). As another example, the command code can comprise a Uniform Resource Locator (URL). The URL can point to a location for data (e.g., a source of content or look up instruction in database 114) or point to a location for data with additional parameters to affect an action, such as to play the content. The URL can be transmitted to one or more controllable devices to effect an operation of the one or more controllable devices (e.g., search for content, play content, etc.).

In an aspect, a signal corresponding to a binary command and/or URL can be transmitted to one or more controllable devices (e.g., controllable device 117). The command code can be associated with the one or more controllable devices.

At step 310, the control device can transmit the command code to the one or more controllable devices (e.g., controllable device 117). The control device can transmit the command code to the one or more controllable devices via a short-range wireless transceiver configured on the control device. As an example, the command code can be transmitted via a short-range communication technique (e.g., BLUETOOTH). In an aspect, transmitting the command code to the one or more controllable devices can comprise other short-range communication techniques such as near-field communication, infra-red, combinations thereof, and the like. The command code can be received by the one or more controllable devices.

Figure 4:
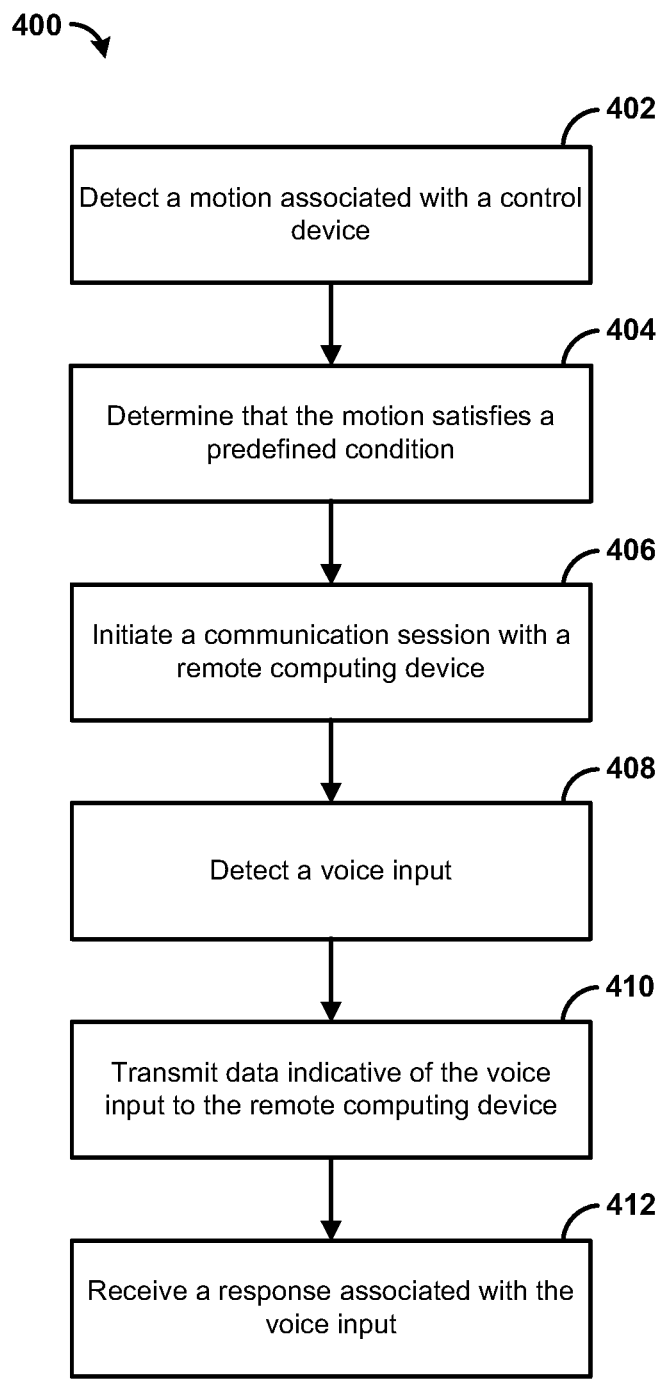
FIG. 4 is a flowchart illustrating another example method for using voice to control devices.

FIG. 4 is a flowchart illustrating an example method 400. At step 402, a control device (e.g., control device 100, a remote control, a smartphone, a tablet, a mobile device, a user device, etc.) can detect a motion (e.g., a gesture, movement, etc.) associated with the control device. A motion (e.g., gesture) can involve a change in orientation or spatial location of the control device. For example, a motion can involve, a user picking up the control device from a surface or storage location, the user placing the control device onto a surface or into a storage location, a proximity of the user's fingers being close to a display of the control device, the user raising the control device to the user's mouth, the user tilting the control device down, the user tilting the control device up, combinations thereof, and the like. Additionally, motions (e.g., gestures) associated with the control device can include a slow shaking, rapid shaking, long movement (one direction), short movement, fast movement, slow movement, etc., of the control device. More complex motions could include axial movement, such that a left to right horizontal movement of the control device, or a circular motion of the control device, while either holding down a button or preselecting the button. Thus, a wide variety of simple and complex motions (e.g., gestures) are contemplated. Other types of motions (e.g., gestures) and actions that could be associated with those gestures will be apparent to a person skilled in the art and all such gestures are intended to be encompassed herein.

The control device can use one or more sensors (e.g., sensors operating alone or in combination) to detect the motion, such as an accelerometer, a gyroscopic sensor, a tilt sensor, a device for measuring eye movement, a pressure sensor, a touch-screen proximity sensor, a fingerprint sensor, a haptic sensor, a digital compass, combinations thereof, and the like.

At step 404, the control device can determine that the motion (e.g., gesture) satisfies a predefined condition. The motion can be processed by the control device to determine if a predefined condition is satisfied. In an aspect, a condition can be predefined such that one or more requirements must be satisfied before an action associated with the control device can occur or be performed. For example, a condition can be satisfied if a threshold is not met, met, and/or exceeded. Alternatively, the condition may not be satisfied if the threshold is not met, met, and/or exceeded. The threshold can be based on measurable parameters that differentiate a motion path of the control device when the control device is picked up, the speed of movement associated with the control device, the orientation of the control device when used (e.g., aimed at a television, pointed up, proximity to a user, etc.), a combination thereof, and the like. As another example, the condition can be associated with specific motion when pressing and/or swiping buttons, key, etc.

In an aspect, the control device can be configured for pattern recognition. The control device can be configured for pattern recognition such that a movement associated with a press of a button, either real or virtual, configured with the control device can be anticipated by the control device. As an example, an upward movement of the control device can be associated with a press (e.g., activation) of a button that is further associated with an operational command. As such, the control device can be configured such that the upward movement of the control device can effectuate a button press associated with an operational command for "channel up" prior to a user actually pressing a "channel up" button configured on the control device. Additionally, the control device can be configured for pattern recognition such that a particular user of the control device can be identified based on frequent or routine occurrences of the motion (e.g., gesture).

A predefined motion (e.g., gesture) can be defined, relative to the control device, by a specific motion from a starting point to an ending point and all points between, a specific relative starting orientation to a final orientation and all orientations in between, a speed of motion, combinations thereof, and the like.

In an aspect, the motion may not be required to satisfy a predefined condition and/or the motion may not be predefined. Instead, an occurrence of the motion (e.g., gesture) can trigger and/or enable an action associated with the control device to occur or be performed (e.g., activating one or more of the sensors, initiating a communication session, maintaining a communication session for a redefined period, etc.).

At step 406, in response to the motion satisfying the predefined condition, the control device can initiate a communication session with a remote computing device (e.g., computing device 104). In an aspect, initiating the communication session can comprise bidirectional messaging between the control device and the remote computing device. As an example, initiating the communication session can comprise transmitting, from the control device, to the remote computing device, a request to communicate. The control device can transmit the request to communicate via a wireless transceiver configured at the control device. Based on the request to communicate, the remote computing device can transmit to the control device a response to the request to communicate. Initiating the communication session can comprise various protocols and services such as or related to HTTP sessions, telnet remote login sessions, a Session Initiation Protocol (SIP), a TCP session, and/or any other suitable technique. In an aspect, in response to the motion satisfying the predefined condition, the communication session can be automatically established and maintained for a predefined period such that subsequent commands associated with the control device (e.g., voice commands, tactile commands, etc.) can be immediately transmitted to the remote computing device.

In an aspect, the remote computing device can be configured for speech recognition such that during the communication session with the control device, voice inputs to the control device can be transferred to the remote computing device for interpretation, analysis, and/or translation.

At step 408, the control device can detect a voice input. As an example, the control device can use one or more sensors to detect a voice input. Sensors used to detect the voice input can include a microphone, a voice sensor, combinations thereof, and the like. The one or more sensors can be operated alone or in combination with other sensors.

In an aspect, the voice input can comprise basic operational commands such as "power on", "power off", "volume up", "volume down", "channel up", "channel down", "play", "pause", and the like. In an aspect, the voice input can comprise complex and/or detailed operational commands associated with one or more devices (e.g., controllable device 117, control device 100, computing device 104, etc.), such as natural language commands, for example. The operational commands can ultimately be used to control the operation of one or more controllable devices (e.g., set top boxes, televisions, radios, game consoles, computing devices 104, controllable devices 117, etc.). In an aspect, the operational commands can comprise device characterizations. The device characterizations are labels that can be associated with one or more controllable devices. Alternatively, the device characterizations can be associated with functions that are relative to one or more devices (e.g., controllable device 117, control device 100, computing device 104, etc.), but are not specific to a particular device. As such, the device characterization can provide and understanding of the device or command. For example, a device characterization for a television may include "TV" or "Television" to reflect a class or type of device. Further, device characterizations associated with the television can include "living room TV." Device characterizations may be associated with functions relative to one or more controllable devices, such as the television. For example, a characterization of "brighter" can apply to a function of increasing the brightness of the television screen. In an aspect, the device characterizations can be based on one or more user preferences. As such, the device characterization can comprise one or more rules establishing a manner in which the user wishes operational commands to be applied. For example, a user may have more than one controllable device capable of producing audio (e.g., television speakers and a sound bar), however, the user only wishes to have audio produced by a specific controllable device (e.g., sound bar only). Thus, an operational command "volume up" can be interpreted according to the user preferences as being directed to the sound bar.

At step 410, the control device can transmit data indicative of the voice input to the remote computing device. In an aspect, the control device can transmit data indicative of the voice input during the communication session initiated by the control device. As an example, the control device can transmit data indicative of the voice input to the remote computing device via a long-range communication technique (e.g., Internet, cellular, satellite, and the like). In an aspect the communication session can be established and maintained for a predefined period such that data indicative of the voice input and/or subsequent commands associated with the control device (e.g., voice commands, tactile commands, etc.) can be immediately transmitted to the remote computing device.

Alternatively, the control device does not transmit data indicative of the voice input to the remote computing device. Instead, the control device can process the voice input and associate the voice input with one or more command codes. The one or more command codes can be associated with the control device and/or one or more controllable devices such as the controllable devices 117. In an aspect, the control device can transmit the one or more command codes to the one or more controllable devices. The one or more controllable devices can execute the one or more command codes.

At step 412, the control device can receive feedback associated with the voice input from the remote computing device. In an aspect, the feedback associated with the voice input can comprise an indication that the remote computing device processed the voice input. In an aspect, processing the voice input can comprise receiving the data indicative of the voice input.

In an aspect, processing the voice input can comprise analyzing one or more voice characteristics associated with the voice input. Voice characteristics can comprise a tone, an inflection, rate of speech, volume of speech, specific phrases and/or any or such characteristic associated with speech. In an aspect, the remote computing device can be configured to identify and store voice characteristics whenever the control device and/or the remote computing device is in a "learn" or "discovery" mode, during an initial setup of the control device and/or the remote computing device, based on repeated use of the control device and/or the remote computing device, combinations thereof, and the like. The voice characteristics can be associated with a particular user and/or one or more operational commands. The operational commands may be stored such that each operational command is associated with a command code. The command code can be associated with the remote computing device and/or one or more controllable devices such as controllable device 117. One or more user settings can be enabled to permit a user to indicate which controllable device should respond to which command code.

In an aspect, processing the voice input can comprise converting the voice input to text such that the text can be compared to a stored set of operational commands. The operational commands can be associated with one or more command codes. For example, the operational commands may be stored such that each operational command is associated with (mapped to) a command code. The one or more command codes can be associated with the remote computing device and/or one or more controllable devices (e.g., controllable device 117).

In an aspect, the one or more command codes can be transmitted from the remote computing device to the one or more controllable devices. In an aspect, feedback associated with the voice input can comprise an indication that the remote computing device transmitted a command code(s) to one or more controllable devices that was executed by the one or more controllable devices. Execution of the command code(s), by the one or more controllable devices, can comprise the one or more controllable devices operating in accordance to the command code. For example, execution of a command code associated with the command "turn on" can comprise the one or more controllable devices turning on from an off state. In another aspect, the indication received at 412 can comprise the one or more command codes and/or a signal to activate an indicator such as a light (e.g., a led, etc.), an audible noise (e.g., a beep, a chime, a ring, etc.), a motion (e.g., a vibration, a shake, etc.), combinations thereof, and the like associated with the control device. Accordingly, the one or more command codes can be transmitted from the remote computing device to the control device (e.g., control device 100). The control device can receive the one or more command codes from the remote computing device and transmit the one or more command codes to the one or more controllable devices. The one or more controllable devices can execute the one or more command codes. Execution of the one or more command codes, by the one or more controllable devices, can comprise the one or more controllable devices operating in accordance to the one or more command codes. For example, execution of a command code associated with the command "turn on" can comprise the one or more controllable devices turning on from an off state.

Figure 5:
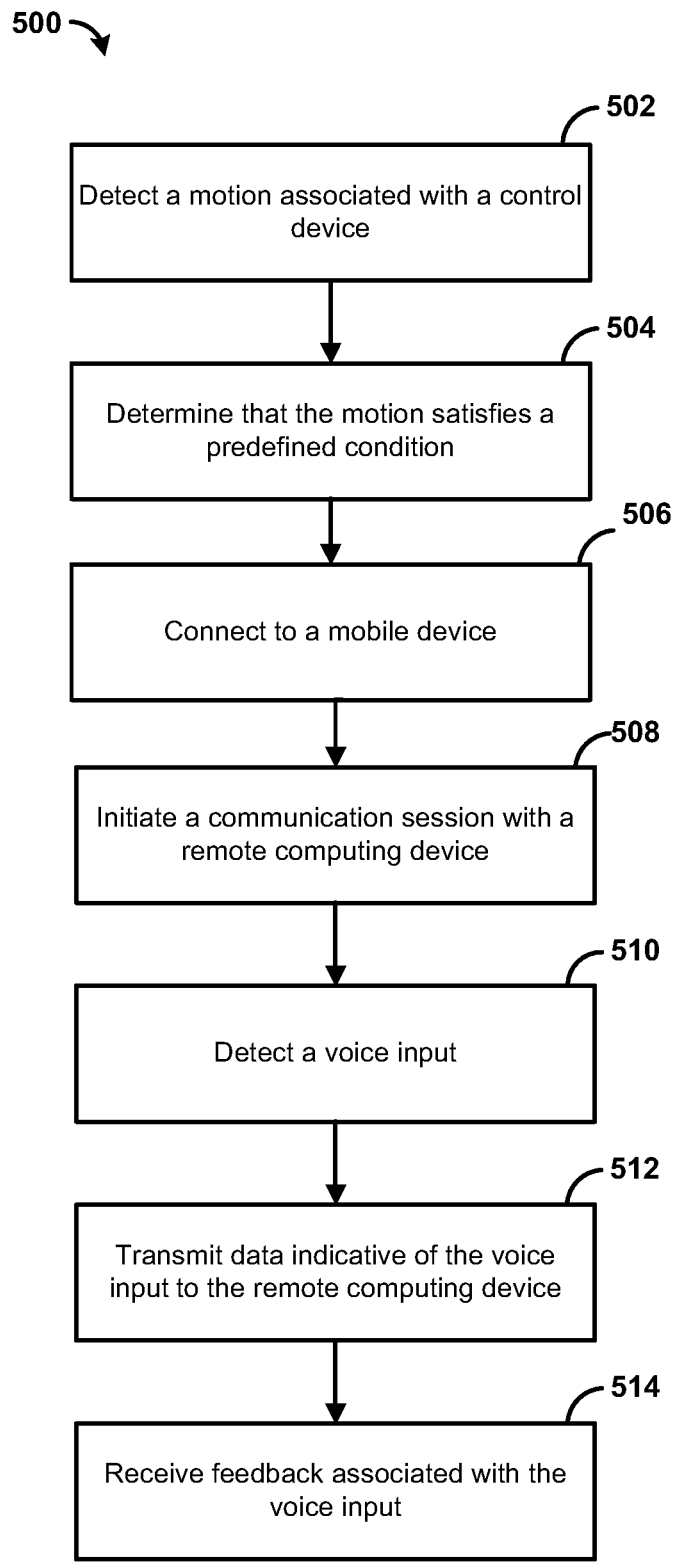
FIG. 5 is a flowchart illustrating another example method for using voice to control devices.

FIG. 5 is a flowchart illustrating an example method 500. At step 502, a control device (e.g., control device 100, a remote control, a smartphone, a tablet, a mobile device, a user device, etc.) can detect a motion (e.g., a gesture, movement) associated with the control device. A motion can involve a change in orientation or spatial location of the control device. For example, a motion (e.g., gesture) can involve, a user picking up the control device from a surface or storage location, the user placing the control device onto a surface or into a storage location, a proximity of the user's fingers being close to a display of the control device, the user raising the control device to the user's mouth, the user tilting the control device down, the user tilting the control device up, combinations thereof, and the like. Additionally, motions (e.g., gestures) associated with the control device can include a slow shaking, rapid shaking, long movement (one direction), short movement, fast movement, slow movement, etc., of the control device. More complex motions could include axial movement, such that a left to right horizontal movement of the control device, or a circular motion of the control device, while either holding down a button or preselecting the button. Thus, a wide variety of simple and complex motions are contemplated. Other types of motions (e.g., gestures) and actions that could be associated with those motions will be apparent to a person skilled in the art and all such motions (e.g., gestures) are intended to be encompassed herein.

The control device can use one or more sensors to detect the motion (e.g., gesture), such as an accelerometer, a gyroscopic sensor, a tilt sensor, a device for measuring eye movement, a pressure sensor, a touch-screen proximity sensor, a fingerprint sensor, a haptic sensor, a digital compass, combinations thereof, and the like.

At step 504, the control device can determine that the motion satisfies a predefined condition. The motion (e.g., gesture) can be processed by the control device to determine if a predefined condition is satisfied. In an aspect, a condition can be predefined such that one or more requirements must be satisfied before an action associated with the control device can occur or be performed. For example, a condition can be satisfied if a threshold is not met, met, and/or exceeded. Alternatively, the condition may not be satisfied if the threshold is not met, met, and/or exceeded. The threshold can be based on measurable parameters that differentiate a motion path of the control device when the control device is picked up, the speed of movement associated with the control device, the orientation of the control device when used (e.g., aimed at a television, pointed up, proximity to a user, etc.), a combination thereof, and the like. As another example, the condition can be associated with specific motion when pressing and/or swiping buttons, key, etc. Additionally, the control device can be configured for pattern recognition such that a particular user of the control device can be identified based on frequent or routine occurrences of the motion (e.g., gesture).

A predefined motion can be defined, relative to the control device, by a specific motion from a starting point to an ending point and all points between, a specific relative starting orientation to a final orientation and all orientations in between, a speed of motion, combinations thereof, and the like.

In an aspect, the motion may not be required to satisfy a predefined condition and/or the motion may not be predefined. Instead, an occurrence of the motion (e.g., gesture) can trigger and/or enable an action associated with the control device to occur or be performed (e.g., activating one or more of the sensors, initiating a communication session, maintaining a communication session for a predefined period, etc.).

At step 506, in response to the motion satisfying the predefined condition, the control device can connect to a mobile device (e.g., communication device 102). In an aspect, connecting to a mobile device can comprise transmitting a request to communicate from the control device to the mobile device. The request to communicate can be transmitted from the control device via a short-range wireless transceiver configured on the control device. As an example, the request to communicate can be transmitted via a short-range communication technique (e.g., BLUETOOTH). The request to communicate can be received by the mobile device. The mobile device can receive the request to communicate and transmit a response to the control device via a low power, short-range wireless transceiver configured on the mobile device. In an aspect, connecting the control device to the mobile device can comprise other short-range communication techniques such as near-field communication, infra-red, combinations thereof, and the like.

At step 508, the control device, via the mobile device, can initiate a communication session with a remote computing device (e.g., computing device 104). In an aspect, initiating the communication session can comprise using a long-range wireless transceiver configured on the mobile device to facilitate bidirectional messaging between the control device and the remote computing device. As an example, initiating the communication session can comprise communication facilitated via a long-range communication technique (e.g., Internet, cellular, satellite, and the like). In an aspect, a request to communicate can be transmitted from the control device, via the mobile device to the remote computing device. Based on the request to communicate, the remote computing device can transmit to the control device, via the mobile device, a response to the request to communicate. In an aspect the communication session can be established and maintained for a predefined period such that data indicative of a voice input and/or subsequent commands associated with the control device (e.g., voice commands, tactile commands, etc.) can be immediately transmitted to the remote computing device.

After the communication session is established, inputs, such as voice inputs received at the control device, can be transmitted to the remote computing device. In an aspect, both the control device and the remote computing device can be configured for voice recognition. In an aspect, during the communication session with the control device, voice inputs to the control device can be interpreted, analyzed, and/or translated by the control device. In another aspect, during the communication session with the control device, voice inputs to the control device can be transferred to the remote computing device for interpretation, analysis, and/or translation. As an example, both the control device and the remote computing device can be configured to recognize the voice input and determine if the voice input comprises an operational command for one or more controllable devices (e.g., controllable device 117, a television, a set-top box, a stereo, a game console, etc.).

At step 510, the control device can detect a voice input. As an example, the control device can use one or more sensors to detect a voice input. Sensors used to detect the voice input can include a microphone, a voice sensor, combinations thereof, and the like.

In an aspect, the voice input can comprise basic operational commands such as "power on", "power off", "volume up", "volume down", "channel up", "channel down", "play", "pause", and the like. In an aspect, the voice input can comprise complex and/or detailed operational commands associated with one or more controllable devices, such as natural language commands, for example. The operational commands can ultimately be used to control the operation of one or more controllable devices (e.g., set top boxes, televisions, radios, game consoles, computing devices 104, controllable devices 117, etc.). In an aspect, the operational commands can comprise device characterizations. The device characterizations are labels that can be associated with one or more controllable devices. Alternatively, the device characterizations can be associated with functions that are relative to one or more devices (e.g., controllable device 117, control device 100, computing device 104, etc.), but are not specific to a particular device. As such, the device characterization can provide and understanding of the device or command. For example, a device characterization for a television may include "TV" or "Television" to reflect a class or type of device. Further, device characterizations associated with the television can include "living room TV." Device characterizations may be associated with functions relative to one or more controllable devices, such as the television. For example, a characterization of "brighter" can apply to a function of increasing the brightness of the television screen. In an aspect, the device characterizations can be based on one or more user preferences. As such, the device characterization can comprise one or more rules establishing a manner in which the user wishes operational commands to be applied. For example, a user may have more than one controllable device (e.g., controllable devices 117) capable of producing audio (e.g., television speakers and a sound bar), however, the user only wishes to have audio produced by a specific controllable device (e.g., sound bar only). Thus, an operational command "volume up" can be interpreted according to the user preferences as being directed to the sound bar.

At step 512, the control device can transmit, via the mobile device, data indicative of the voice input to the remote computing device. As an example, the control device can transmit the data indicative of the voice input during the communication session initiated by the control device. As an example, the control device can transmit data indicative of the voice input to the mobile device via a short-range communication technique (e.g., BLUETOOTH), the mobile device can receive the data indicative of the voice input, and the mobile device can transmit the data indicative of the voice input to the remote computing device via a long-range communication technique (e.g., Internet, cellular, satellite, and the like).

In an aspect, the control device does not transmit, via the mobile device, the data indicative voice input to the remote computing device. Instead, the control device can process the voice input and associate the voice input to one or more command codes. The one or more command codes can be associated with the control device and/or one or more controllable devices such as controllable devices 117. In an aspect, the control device can transmit the one or more command codes to the one or more controllable devices. The one or more controllable devices can execute the one or more command codes. Execution of the one or more command codes, by the one or more controllable devices, can comprise the one or more controllable devices operating in accordance to the one or more command codes For example, execution of a command code associated with the command "turn on" can comprise the one or more controllable devices turning on from an off state.

At step 514, the control device can receive, via the mobile device, feedback associated with the voice input from the remote computing device. In an aspect, the feedback associated with the voice input can comprise an indication that the remote computing device processed the voice input. In an aspect, processing the voice input can comprise receiving the data indicative of the voice input.

In an aspect, processing the voice input can comprise analyzing one or more voice characteristics associated with the voice input. Voice characteristics can comprise a tone, an inflection, rate of speech, volume of speech, specific phrases and/or any or such characteristic associated with speech. In an aspect, the remote computing device can be configured to identify and store voice characteristics whenever the control device and/or the remote computing device is in a "learn" or "discovery" mode, during an initial setup of the control device and/or the remote computing device, based to repeated use of the control device and/or the remote computing device, combinations thereof, and the like. The voice characteristics can be associated with a particular user and/or one or more operational commands. The operational commands may be stored such that each operational command is associated with a command code. The command code can be associated with the remote computing device and/or one or more controllable devices such as controllable device 117. One or more user settings can be enabled to permit a user to indicate which controllable device should respond to which command code.

In an aspect, processing the voice input can comprise converting the voice input to text such that the text can be compared to a stored set of operational commands. The operational commands may be stored such that each operational command is associated with a command code. One or more command codes can be associated with the remote computing device and/or one or more controllable devices such as controllable devices 117. One or more user settings can be enabled to permit a user to indicate which controllable device should respond to which command code. The one or more command codes can be transmitted from the remote computing device to the one or more controllable devices. In an aspect, the feedback associated with the voice input can comprise an indication that the remote computing device transmitted one or more command codes to one or more controllable devices that were executed by the one or more controllable devices. Execution of the one or more command codes, by the one or more controllable devices, can comprise the one or more controllable devices operating in accordance to the one or more command codes. For example, execution of a command code associated with the command "turn on" can comprise the one or more controllable devices turning on from an off state.

In an aspect, the indication can comprise the one or more command codes and/or a signal to activate an indicator such as a light (e.g., a led, etc.), an audible noise (e.g., a beep, a chime, a ring, etc.), a motion (e.g., a vibration, a shake, etc.), combinations thereof, and the like associated with the control device. Accordingly, the one or more command codes can be transmitted from the remote computing device to the control device (e.g., control device 100). The control device can receive the one or more command codes from the remote computing device and transmit the one or more command codes to the one or more controllable devices. The one or more controllable devices can execute the one or more command codes. Execution of the one or more command codes, by the one or more controllable devices, can comprise the one or more controllable devices operating in accordance to the one or more command codes. For example, execution of a command code associated with the command "turn on" can comprise the one or more controllable devices turning on from an off state.

Figure 6:
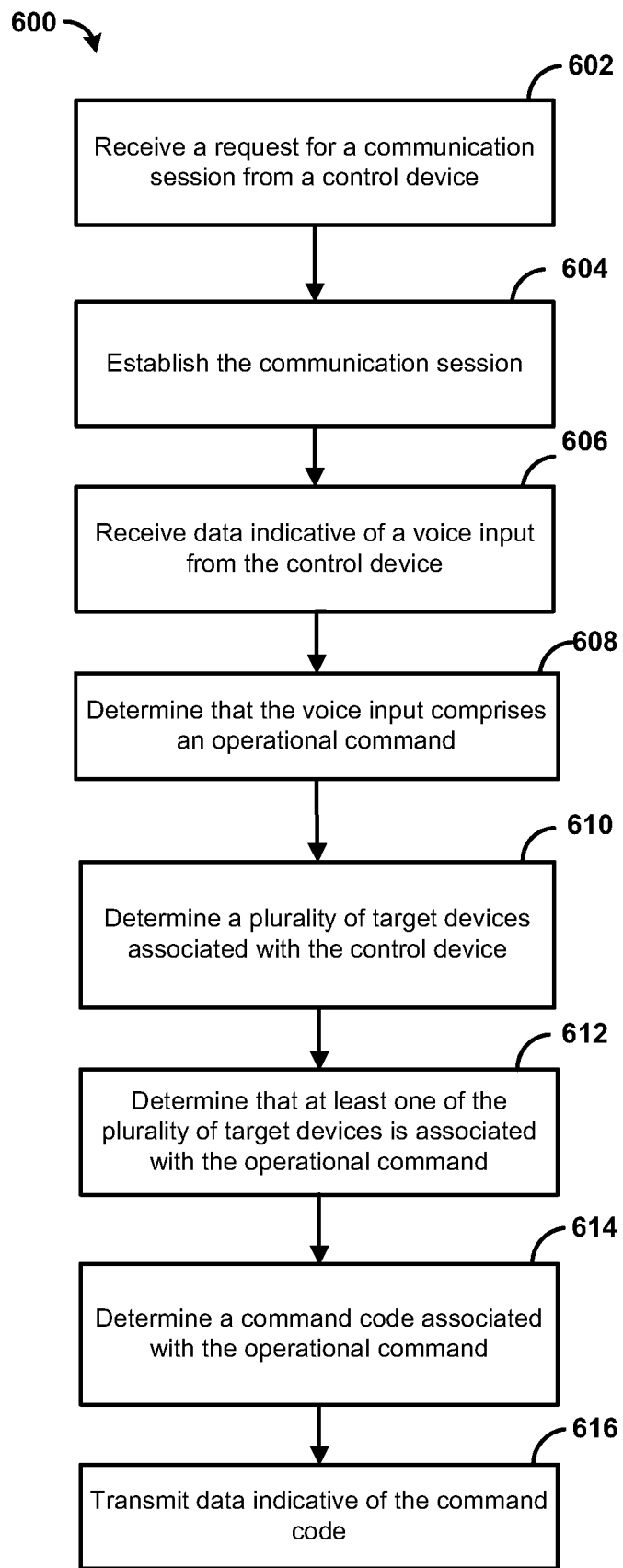
FIG. 6 is a flowchart illustrating another example method for using voice to control devices.

FIG. 6 is a flowchart illustrating an example method 600. At step 602 a remote computing device (e.g., computing device 104) can receive a request for a communication session from a control device (e.g., control device 100, a remote control, a smartphone, a tablet, a mobile device, a user device, etc.). In an aspect, the communication session can comprise a long-range communication technique (e.g., Internet, cellular, satellite, and the like). The communication session can comprise various protocols and services such as or related to HTTP sessions, telnet remote login sessions, a Session Initiation Protocol (SIP), a TCP session, and/or any other suitable technique.

At step 604, in response to the request for the communication session, the remote computing device can establish the communication session with the control device. In an aspect, establishing the communication session can comprise transmitting a response to the request to communicate to the control device. In an aspect the communication session can be established and maintained for a predefined period such that data indicative of a voice input and/or subsequent commands associated with the control device (e.g., voice commands, tactile commands, etc.) can be immediately transmitted to the remote computing device.

At step 606, the remote computing device can receive data indicative of a voice input (e.g., a user voice command) from the control device. In an aspect, the voice input can be detected by the control device. The voice input can be detected by the control device via a sensor associated with the control device and activated upon detection, by the control device, of a motion (e.g., gesture). As an example, the control device can activate a microphone upon detecting the motion of the user moving the control device to the user's mouth (thus indicating a likelihood that the user wishes to provide a voice input/voice command). Once the user provides a voice input (e.g., voice command), data indicative of the voice input can be transmitted to the remote computing device, from the control device, during the communication session.

In an aspect, the remote computing device does not receive the data indicative of the voice input from the control device. Instead, the control device can process the voice input and associate the voice input with one or more command codes. The one or more command codes can be associated with the control device and/or one or more controllable devices such as controllable devices 117. The control device can transmit the one or more command codes to the one or more controllable devices. The one or more controllable devices can execute the one or more command codes. Execution of the one or more command codes, by the one or more controllable devices, can comprise the one or more controllable devices operating in accordance to the one or more command codes. For example, execution of a command code associated with the command "turn on" can comprise the one or more controllable devices turning on from an off state.

At step 608, the remote computing device can determine that the voice input comprises an operational command. An operational command can comprise an instruction intended to cause a change in operational state of a controllable device. As previously described (e.g., step 306, step 408, step 510), the voice input can comprise basic operational commands such as "power on", "power off", "volume up", "volume down", "channel up", "channel down", "play", "pause", and the like. Further, the voice input can comprise complex and/or detailed operational commands (e.g., natural language commands) associated with the remote computing device and/or one or more controllable devices (e.g., controllable device 117).

In an aspect, determining whether the voice input comprises an operational command can comprise analyzing one or more voice characteristics associated with the voice input. Voice characteristics can comprise tone, inflection, rate of speech, volume of speech, specific phrases, combinations thereof, and the like. In an aspect, the remote computing device can be configured to analyze voice characteristics associated with the voice input and identify particular voice characteristics. The remote computing device can query a database of stored information to determine if the particular voice characteristics correspond to the stored information. The stored information can represent a profile associated with a user and/or the control device (e.g., a user profile). The profile can comprise voice characteristics that correspond to one or more operational commands. By comparing the particular voice characteristic to the profile, it can be determined that the voice input comprises an operational command. Alternatively, by comparing the particular voice characteristic to the profile, it can be determined that the voice input does not comprise an operational command. As an example, if it is determined that an identified voice characteristic associated with a voice input matches and/or is associated with a profile comprising voice characteristics and operational commands, then it can be determined that the voice input comprises an operational command.

In an aspect, determining whether the voice input comprises an operational command can comprise converting the voice input to text such that the text can be compared to one or more operational commands stored in a profile. As an example, the voice input can be converted to text and compared to a stored set of operational commands (e.g. a profile), if the text does not match a stored operational command, then the voice input may not comprise an operational command. If the text matches a stored operational command, then it can be determined that the voice input comprises an operational command.

In an aspect, determining whether the voice input comprises an operational command can comprise analyzing one or more voice characteristics associated with the voice input. Then, based on the analysis, the voice input can be converted to text and compared to a stored set of operational commands. As an example, the remote computing device can be configured to analyze voice characteristics associated with the voice input, identify particular voice characteristics, determine if the particular voice characteristics satisfy a threshold, and convert the voice input to text based on the voice characteristics satisfying the threshold.

A threshold can be based on whether the voice characteristics have been programmed and/or stored at the remote computing device, whether the voice characteristics are associated with a profile (e.g., user profile), and/or any other suitable measure associated with the voice characteristics. As such, a specific user of the system and method can be identified (e.g., a user with a stored user profile can be identified). Based on the particular voice characteristics satisfying the threshold, the voice input can be converted to text such that the text can be compared to a stored set of operational commands. As an example, after the voice input has been converted to text and compared to the stored set of operational commands (e.g., profile), if the text does not match a stored operational command, then it can be determined that the voice input does not comprise an operational command. If the derived text matches a stored operational command, then it can be determined that the voice input comprises an operational command.

At step 610, the remote computing device can determine a plurality of target devices (e.g., controllable devices 117) associated with the control device. Determining the plurality of target devices associated with the control device can be performed by relating an identifier associated with the control device (e.g., a control ID, device identifier 122) to stored profile(s) comprising device identifiers (device IDs) associated with a plurality of devices (e.g., controllable devices 117) within a network (e.g., network 105). In an aspect, the profile can be created and stored according to a device discovery protocol and/or technique (e.g., DNS-based service discovery, advanced device discovery protocol, simple service discovery protocol, etc.). In an aspect, the profile can be created and stored by a user of the control device when a private and/or public network is provisioned. As an example, the remote computing device can receive, via the request for the communication session, a control ID. The remote computing device can query a database (e.g., database 114) and determine that the control ID is associated with a stored profile. The stored profile can comprises one or more device IDs (e.g., identifier 118, identifier 122) associated with the control device. If the control ID is not associated with a stored profile then a profile associated with the control device can be created and stored. As an example, a plurality of device IDs (e.g., identifier 118) associated with the control ID (e.g., identifier 122) can indicate a plurality of target devices associated with the control device.

At step 612, the remote computing device can determine that one of the plurality of target devices (e.g., controllable device 117) associated with the control device is associated with the operational command. In an aspect, the remote computing device can determine that the operational command is a supported operational command for the one of the plurality of target devices. For example, the profile can comprise a listing of a user's controllable devices (e.g., the control ID associated with the device IDs) along with supported functions. For example, a television may have built in speakers. The television may also be connected to a sound system with speakers. The television may also be connected to a Blu-ray player. If the operational command received is "volume up," the remote computing device can determine that there is a volume function mapped only to the television and the sound system, not the Blu-ray player. Therefore, the operational command "volume up" is only associated with device IDs for the television and the sound system and not the Blu-ray player.

At step 614, the remote computing device can determine a command code associated with the operational command. A command code associated with an operational command can be used to control the operation of one or more controllable devices (e.g., set top boxes, televisions, radios, game consoles, controllable device 117, etc.). In an aspect, a command code can be associated with the remote computing device and/or one or more controllable devices such as controllable device 117. In an aspect, a profile can associate/map the operational command with/to the command code. The remote computing device can associate the operational command to a command code and associate the command code with a device ID. For example, the remote computing device can match an operational command associated with a command code with a device ID associated with the command code. A match between the operational command associated with the command code and the device ID associated with the command code can indicate that the device is associated with the operational command. An association with the operational command can indicate that the device is configured to execute the command code.

In an aspect, the profile can comprise one or more user settings that reflect how the operational command should be applied. For example, the remote computing device can determine from the profile that the user utilizes the sound system for audio and not the speakers of the television. Therefore, the remote computing device can determine that an operational command, "volume up" is associated with the sound system, not the television with speakers, and associate a command code for "volume up" to the sound system.

At step 616, the remote computing device can transmit data indicative of the command code to the control device. In an aspect, the command code can comprise a computer executable instruction to effect the operational command. As an example, the command code can comprise a binary command. The binary command can be transmitted and/or provided to a device, to affect the operation of the device (e.g., 0010010 for volume up, 0010001 for channel up, etc.). As another example, the command code can comprise a Uniform Resource Locator (URL). The URL can point to a location for data (e.g., a source of content or look up instruction in database 114) or point to a location for data with additional parameters to affect an action, such as to play the content. The URL can be transmitted and/or provided to a device to effect an operation of the device (e.g., search for content, play content, etc.).

In an aspect, a signal corresponding to a binary command and/or URL can be transmitted to a device (e.g., controllable device 117). The command code can be transmitted either by a short-range communication technique (e.g., infrared technology, BLUETOOTH®, near-field communication, and the like) or a long-range communication technique (e.g., Internet, cellular, satellite, and the like). As an example of a short-range communication technique for transmitting command codes, the command code can be transmitted by an infrared transmitter such that a series of light pulses are emitted that correspond to the binary command. As an example of a long-range communication technique for transmitting command codes, the binary code and/or URL can be compiled in a digital signal transmitted over a high-speed digital connection (e.g., Internet). A command code can comprise a command in compliance with one or more standards such as Audio/Video Remote Control Profile (AVRCP).

In an aspect, the data indicative of the command code can be the command code associated with the operational command. In another aspect, the data indicative of the command code can comprise the device IDs associated with the one of the plurality of target devices associated with the operational command. Based on the data indicative of the command code associated with the operational command and the device IDs, the control device can determine that the voice input (e.g., data indicative of the voice input) was received and/or executed by one or more target devices.

In another aspect, the remote computing device can transmit the data indicative of the command code and/or the device ID to the control device, (e.g., control device 100) whereupon the control device transmits the data indicative of the command code to the one of the plurality of target devices. The one of the plurality of target devices can execute the command code. Execution of the command code, by the one of the plurality of target devices, can comprise the one of the plurality of target devices operating in accordance with the command code. For example, execution of a command code associated with the command "turn on" can comprise the one of the plurality of target devices turning on from an off state.

Figure 7:
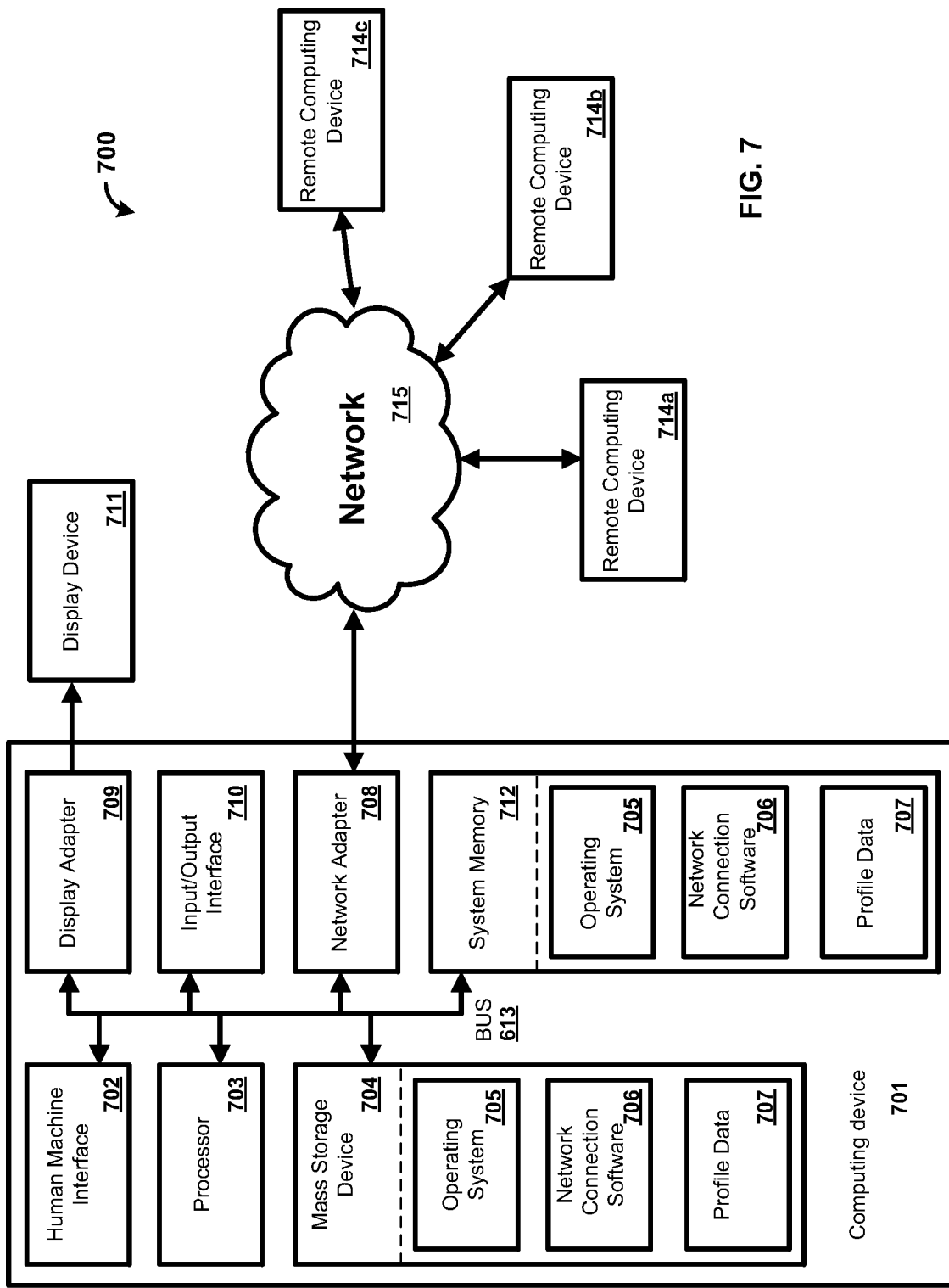
FIG. 7 is a block diagram illustrating an example computing device in which the present methods and systems operate.

In an exemplary aspect, the methods and systems can be implemented on a computer 701 as illustrated in FIG. 7 and described below. By way of example, the communication device 102, the controllable device 117, and the computing device 104 of FIG. 1 can be a computer as illustrated in FIG. 7. Similarly, the methods and systems disclosed can utilize one or more computers to perform one or more functions in one or more locations. FIG. 7 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 701. The components of the computer 701 can comprise, but are not limited to, one or more processors 703, a system memory 712, and a system bus 713 that couples various system components including the one or more processors 703 to the system memory 712. The system can utilize parallel computing.

The system bus 713 represents one or more of several possible types of bus structures, including a memory bus or memory controller, a peripheral bus, an accelerated graphics port, or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 713, and all buses specified in this description can also be implemented over a wired or wireless network connection and each of the subsystems, including the one or more processors 703, a mass storage device 704, an operating system 705, network connection software 706, profile data 707, a network adapter 708, the system memory 712, an Input/Output Interface 710, a display adapter 709, a display device 711, and a human machine interface 702, can be contained within one or more remote computing devices 714a,b,c at physically separate locations, connected through buses of this form, in effect implementing a fully distributed system.

The computer 701 typically comprises a variety of computer readable media. Exemplary readable media can be any available media that is accessible by the computer 701 and comprises, for example and not meant to be limiting, both volatile and non-volatile media, removable and non-removable media. The system memory 712 comprises computer readable media in the form of volatile memory, such as random access memory (RAM), and/or non-volatile memory, such as read only memory (ROM). The system memory 712 typically contains data such as the profile data 707 and/or program modules such as the operating system 705 and the network connection software 706 that are immediately accessible to and/or are presently operated on by the one or more processors 703.

In another aspect, the computer 701 can also comprise other removable/non-removable, volatile/non-volatile computer storage media. By way of example, FIG. 7 illustrates the mass storage device 704 which can provide non-volatile storage of computer code, computer readable instructions, data structures, program modules, and other data for the computer 701. For example and not meant to be limiting, the mass storage device 704 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 704, including by way of example, the operating system 705 and the network connection software 706. Each of the operating system 705 and the network connection software 706 (or some combination thereof) can comprise elements of the programming and the network connection software 706. The profile data 707 can also be stored on the mass storage device 704. The profile data 707 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 701 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the one or more processors 703 via the human machine interface 702 that is coupled to the system bus 713, but can be connected by other interface and bus structures, such as a parallel port, game port, an IEEE 1394 Port (also known as a Firewire port), a serial port, or a universal serial bus (USB).

In yet another aspect, the display device 711 can also be connected to the system bus 713 via an interface, such as the display adapter 709. It is contemplated that the computer 701 can have more than one display adapter 709 and the computer 701 can have more than one display device 711. For example, the display device 711 can be a monitor, an LCD (Liquid Crystal Display), or a projector. In addition to the display device 711, other output peripheral devices can comprise components such as speakers (not shown) and a printer (not shown) which can be connected to the computer 701 via the Input/Output Interface 710. Any step and/or result of the methods can be output in any form to an output device. Such output can be any form of visual representation, including, but not limited to, textual, graphical, animation, audio, tactile, and the like. The display device 711 and computer 701 can be part of one device, or separate devices.

The computer 701 can operate in a networked environment using logical connections to one or more remote computing devices 714a,b,c. By way of example, a remote computing device can be a personal computer, portable computer, smartphone, a server, a router, a network computer, a peer device or other common network node, and so on. Logical connections between the computer 701 and a remote computing device 714a,b,c can be made via a network 715, such as a local area network (LAN) and/or a general wide area network (WAN). Such network connections can be through the network adapter 708. The network adapter 708 can be implemented in both wired and wireless environments. Such networking environments are conventional and commonplace in dwellings, offices, enterprise-wide computer networks, intranets, and the Internet.

For purposes of illustration, application programs and other executable program components such as the operating system 705 are illustrated herein as discrete blocks, although it is recognized that such programs and components reside at various times in different storage components of the computing device 701, and are executed by the one or more processors 703 of the computer. An implementation of the network connection software 706 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The following examples are put forth so as to provide those of ordinary skill in the art with a complete disclosure and description of how the devices and/or methods claimed herein are made and evaluated, and are intended to be purely exemplary and are not intended to limit the scope of the methods and systems. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

The invention claimed is:

1. One or more non-transitory computer-readable media storing processor-executable instructions that, when executed by at least one processor, cause the at least one processor to:
   establish, based on a motion associated with a control device satisfying a motion threshold, a communication session with a computing device;
   determine a voice input; and
   send, to the computing device via the communication session, data indicative of the voice input.

2. The one or more non-transitory computer-readable media of claim 1, wherein sending the data indicative of the voice input causes a response to be sent to one or more target devices, wherein the response is associated with the data indicative of the voice input.

3. The one or more non-transitory computer-readable media of claim 2, wherein the response associated with the data indicative of the voice input comprises a command code, and wherein the processor-executable instructions further cause the at least one processor to send, to the one or more target devices, the command code.

4. The one or more non-transitory computer-readable media of claim 3, wherein the processor-executable instructions further cause the at least one processor to execute, based on the command code, an operational command.

5. The one or more non-transitory computer-readable media of claim 1, wherein the motion threshold is associated with at least one movement associated with the control device.

6. The one or more non-transitory computer-readable media of claim 5, wherein the at least one movement is associated with a quantity of movements of the control device.

7. A system comprising:
   a control device configured to:
      establish, based on a motion associated with the control device satisfying a motion threshold, a communication session with a computing device,
      determine a voice input, and
      send, to the computing device via the communication session, data indicative of the voice input; and
   the computing device configured to:
      receive the data indicative of the voice input.

8. The system of claim 7, wherein the computing device is further configured to, based on the data indicative of the voice input, send a response to one or more target devices, wherein the response is associated with the data indicative of the voice input.

9. The system of claim 8, wherein the response comprises a command code.

10. The system of claim 9, further comprising:
    the one or more target devices configured to:
       execute, based on the command code, an operational command.

11. The system of claim 7, wherein the control device is further configured to, based on the data indicative of the voice input, send a response to one or more target devices, wherein the response is associated with the data indicative of the voice input.

12. The system of claim 11, wherein the response comprises a command code.

13. The system of claim 12, further comprising:
    the one or more target devices configured to:
       execute, based on the command code, an operational command.

14. The system of claim 7, wherein the motion threshold is associated with at least one movement associated with the control device.

15. The system of claim 14, wherein the at least one movement is associated with a quantity of movements of the control device.

16. One or more non-transitory computer-readable media storing processor-executable instructions that, when executed by at least one processor, cause the at least one processor to:
    detect a motion associated with a control device;
    determine that the motion satisfies a motion threshold;
    establish, based on the motion satisfying the motion threshold, a communication session with a network device;
    detect a voice input;
    send, to the network device via the communication session, data indicative of the voice input; and
    receive, from the network device, a response associated with the data indicative of the voice input.

17. The one or more non-transitory computer-readable media of claim 16, wherein detecting the motion comprises determining, based on data from an accelerometer, a movement associated with the control device.

18. The one or more non-transitory computer-readable media of claim 16, wherein the motion threshold is associated with a quantity of movements of the control device.

19. The one or more non-transitory computer-readable media of claim 16, wherein the response associated with the data indicative of the voice input comprises a command code, and wherein the processor-executable instructions further cause the at least one processor to send, to one or more target devices, the command code.

20. The one or more non-transitory computer-readable media of claim 19, wherein the processor-executable instructions further cause the at least one processor to execute, based on the command code, an operational command.

21. A system comprising:
   a control device configured to:
      detect a motion associated with the control device,
      determine that the motion satisfies a motion threshold,
      establish, based on the motion satisfying the motion threshold, a communication session with a network device,
      detect a voice input,
      send, to the network device via the communication session, data indicative of the voice input, and
      receive, from the network device, a response associated with the data indicative of the voice input; and
   the network device configured to:
      receive the data indicative of the voice input.

22. The system of claim 21, wherein the control device is further configured to determine, based on data from an accelerometer, a movement associated with the control device to detect the motion.

23. The system of claim 21, wherein the motion threshold is associated with a quantity of movements of the control device.

24. The system of claim 21, wherein the response associated with the data indicative of the voice input comprises a command code, and wherein the control device is further configured to send, to one or more target devices, the command code.

25. The system of claim 24, further comprising:
   the one or more target devices configured to:
      execute, based on the command code, an operational command.

* * * * *